US 9,219,364 B2

(12) United States Patent
Tomiyama et al.

(10) Patent No.: US 9,219,364 B2
(45) Date of Patent: Dec. 22, 2015

(54) PUBLIC POWER SUPPLY SYSTEM

(75) Inventors: Shota Tomiyama, Tokyo (JP); Kengo Muraki, Tokyo (JP); Masayuki Shigehara, Tokyo (JP)

(73) Assignee: Tokyo Electric Power Company, Incorporated, Tokyo (JP)

( * ) Notice: Subject to any disclaimer, the term of this patent is extended or adjusted under 35 U.S.C. 154(b) by 604 days.

(21) Appl. No.: 13/634,790

(22) PCT Filed: Mar. 14, 2011

(86) PCT No.: PCT/JP2011/055984
§ 371 (c)(1),
(2), (4) Date: Sep. 13, 2012

(87) PCT Pub. No.: WO2011/115086
PCT Pub. Date: Sep. 22, 2011

(65) Prior Publication Data
US 2013/0006430 A1    Jan. 3, 2013

(30) Foreign Application Priority Data

Mar. 15, 2010  (JP) ................. 2010-058486
Mar. 14, 2011  (JP) ................. 2011-055271

(51) Int. Cl.
| G06F 1/26 | (2006.01) |
| H02J 3/00 | (2006.01) |
| H02J 13/00 | (2006.01) |
| G06Q 20/32 | (2012.01) |
| G07F 15/00 | (2006.01) |

(52) U.S. Cl.
CPC ............ *H02J 3/008* (2013.01); *G06Q 20/3276* (2013.01); *G07F 15/003* (2013.01); *H02J 13/0062* (2013.01); *H02J 13/0079* (2013.01); *H02J 13/0075* (2013.01); *Y02B 90/2638* (2013.01); *Y02B 90/2653* (2013.01); *Y02B 90/2669* (2013.01); *Y04S 40/124* (2013.01); *Y04S 40/126* (2013.01); *Y04S 40/128* (2013.01); *Y04S 50/10* (2013.01); *Y04S 50/12* (2013.01)

(58) Field of Classification Search
CPC ... H02J 3/008; H02J 13/0079; H02J 13/0062; H02J 13/0075; G06Q 20/3276; G07F 15/003; Y04S 50/10; Y04S 40/126; Y04S 40/124; Y04S 50/12; Y04S 40/128; Y02B 90/2638; Y02B 90/2653; Y02B 90/2669
See application file for complete search history.

(56) References Cited

U.S. PATENT DOCUMENTS

| 5,803,215 A | * | 9/1998 | Henze et al. ................ 191/2 |
| 2008/0019067 A1 | * | 1/2008 | Reynolds et al. ............ 361/93.1 |

(Continued)

FOREIGN PATENT DOCUMENTS

| JP | 09-145743 | 6/1997 |
| JP | 2002-044882 | 2/2002 |
| JP | 2004-118498 | 4/2004 |

(Continued)

*Primary Examiner* — Sean Shechtman
(74) *Attorney, Agent, or Firm* — Muramatsu & Associates

(57) ABSTRACT

A public power supply system makes it possible to use power in a public location both conveniently and safely without erroneous operations. An outlet, to which power is supplied from a distribution line, is installed in advance in a predetermined public location and a communication terminal requesting the outlet to supply power and a center server are connected in advance via an Internet and when there is a request to the outlet to supply power, the center server outputs a current supply command to a current control unit via a communication network (Internet or telephone network) and the current control unit permits supply of a current to be supplied to the outlet when there is a current supply command and there is information to allow supply of a current to the outlet generated using a remote control prevention device installed near the outlet.

11 Claims, 15 Drawing Sheets

(56) References Cited

U.S. PATENT DOCUMENTS

| | | | | |
|---|---|---|---|---|
| 2010/0013433 | A1* | 1/2010 | Baxter et al. | 320/109 |
| 2010/0301809 | A1* | 12/2010 | Bhade et al. | 320/148 |
| 2010/0306033 | A1* | 12/2010 | Oved et al. | 705/10 |

FOREIGN PATENT DOCUMENTS

| | | |
|---|---|---|
| JP | 2006-94655 | 4/2006 |
| JP | 2008-263712 | 10/2008 |
| JP | 2010-041759 | 2/2010 |

* cited by examiner

PUBLIC POWER SUPPLY SYSTEM

This application is a national stage of International Application No. PCT/JP2011/055984 filed Mar. 14, 2011, claiming foreign filing priority of Japanese Patent Application No. 2010-058486, filed Mar. 15, 2010, and Japanese Patent Application No. 2011-055271, filed Mar. 14, 2011, the entire contents of which are incorporated herein by reference.

TECHNICAL FIELD

The present invention relates to a public power supply system in which an outlet, to which power is supplied from a transmission line, distribution line, or local cable, is installed in advance in a predetermined public location and which makes it possible to use power in a public location.

BACKGROUND ART

In general, a customer receives supply of power from a transmission line or distribution line from an electric supply company based on a contract made in advance with the electric supply company and guides power to the local cable of the customer to supply power to electric appliances from an outlet. The outlet is installed inside of the customer or the site.

Ordinarily, power supplied to the outlet from the electric supply company is supplied from the local cable via the distribution line, but, there is a case where power is supplied directly from the transmission line or distribution line, and therefore, in the following explanation, the outlet to which power is supplied from the distribution line includes an outlet to which power is supplied directly from the transmission line or distribution line and an outlet to which power is supplied from the local cable.

As described above, a customer connects plugs of various kinds of electric appliances into the outlet to which power is supplied from the distribution line and uses the electric appliances. In this manner, ordinarily, power is used via the outlet in the customer site.

On the other hand, when the contracted power is determined based on the contract made with the electric supply company, a breaker having a current limit value in correspondence to the contracted power is installed in the customer and the maximum current that can be used in the customer is suppressed to within the current limit value determined by the breaker.

There is a system in which a home server is installed in a customer site to make it possible to check the power supply state for electric appliances connected to a plurality of outlets of a table tap in the house or to switch the power supply state to another if necessary by transmitting a control signal to the home server from a push telephone while leaving home (for example, see PLT 1).

CITATION LIST

Patent Literature

PTL 1: Japanese Patent Laid-Open No. 2002-44882

SUMMARY OF INVENTION

Technical Problem

However, according to the system described in PTL 1, it is possible to check the current supply state of a plurality of outlets or to perform on/off control of current supply while leaving home etc., but the outlet to be used is the outlet belonging to the customer, and therefore, it is not possible to use electric appliances while leaving home. When intending to use electric appliances while leaving home, the only way is to borrow an outlet of a nearby customer site (another person) to receive supply of power.

If an outlet, to which power is supplied from a distribution line or local cable, is installed in advance in a predetermined public location and the outlet can be used, it is made possible to use power in a public location not in the customer site.

The maximum current that can be used in a customer site is determined by the current limit value determined by the breaker of the customer and also in the case of an outlet installed in a predetermined public location, it is necessary to set a current limit value. This is to prevent other customers of the distribution line to which the outlet is connected and the upper system from being affected adversely.

Because of this, a current limit value is set also to the current supplied to the outlet, but, in such a case, if a breaker is installed in the outlet to be installed in a predetermined public location and a current limit value is set to a value determined by the breaker, the current limit value is fixed. Consequently, it is necessary to exchange the breaker with another to change the current limit value. It is desired that the current limit value of the outlet to be installed in a predetermined public location can be easily changed in accordance with use circumstances so that a case where the power used exceeds an initially estimated value can be dealt with flexibly.

Further, even when an outlet, to which power is supplied from a distribution line, is installed in advance in a predetermined public location if the installation location of the outlet is not widely known to users, it is not possible to make an effective use of the outlet in the public location. Consequently, it is desired that the installation location of the outlet can be widely known to users.

Furthermore, the location where users can use the outlet is only the installation location of the outlet, and therefore, it is not acceptable to make it possible to use the outlet by remote control. Consequently, it is desired to prevent the state where the outlet can be used by remote control.

An object of the present invention is to provide a public power supply system by which power can be used in a public location conveniently and safely which can bring about the state where the outlet can be used only in the installation location of the outlet.

Solution to Problem

A public power supply system according to the invention of the first aspect is characterized by including: an outlet installed in advance in a predetermined public location and supplied with power from a distribution line; a current control unit connected between the outlet and the distribution line and configured to control whether or not to allow supply of a current to be supplied to the outlet; a communication terminal requesting the outlet to supply power; a remote control prevention device installed near the outlet and configured to generate information to allow supply of a current to the outlet by an actual operation of a user; and a center server connected with the communication terminal via the Internet and connected with the current control unit via a communication network, and configured to determine whether or not information to allow supply of a current has been received from the remote control prevention device when there is a request by a user to supply power to the outlet from the communication terminal and to output a current supply command to the current control unit when the information to allow supply of a current has been received.

A public power supply system according to the invention of the second aspect is characterized in that, in the first aspect, a user specifying information reader configured to read user specifying information for specifying a user is provided to the current control unit near the outlet, and the center server outputs a current supply command to the current control unit when the user specifying information read by the user specifying information reader is user-registered.

A public power supply system according to the invention of the third aspect is characterized in that, in the invention of the second aspect, the user specifying information is user identifying information stored in a contactless IC card and the user specifying information reader is a contactless IC card reader.

A public power supply system according to the invention of the fourth aspect is characterized in that, in the invention of any one of the first to third aspects, the remote control prevention device includes a display device configured to display a variable identification marker for identifying the outlet, which is changed each time the outlet is used, and the center server determines that information to allow supply of a current is received when an actual operation to cause the communication terminal to read the variable identification marker displayed on the display device is performed by a user and the variable identification marker is transmitted to the center server and the variable identification marker is received from the communication terminal.

A public power supply system according to the invention of the fifth aspect is characterized by including an outlet installed in advance in a predetermined public location and supplied with power from a distribution line; a current control unit connected between the outlet and the distribution line and configured to control whether or not to allow supply of a current to be supplied to the outlet; a communication terminal requesting the outlet to supply power; a remote control prevention device installed near the outlet and configured to generate information to allow supply of a current to the outlet by an actual operation of a user; and a center server connected with the communication terminal via the Internet and connected with the current control unit via a communication network, and configured to output a current supply command to the current control unit when there is a request by a user to supply power to the outlet from the communication terminal, wherein the current control unit determines whether or not information to allow supply of a current has been received from the remote control prevention device and makes valid a current supply command from the center server when the information to allow supply of a current has been received.

A public power supply system according to the invention of the sixth aspect is characterized in that, in the invention of the fifth aspect, a user specifying information reader configured to read user specifying information for specifying a user is provided to the current control unit near the outlet, and the center server outputs a current supply command to the current control unit when the user specifying information read by the user specifying information reader is user-registered.

A public power supply system according to the invention of the seventh aspect is characterized in that, in the invention of the sixth aspect, the user specifying information is user identifying information stored in a contactless IC card and the user specifying information reader is a contactless IC card reader.

A public power supply system according to the invention of the eighth aspect is characterized in that, in the invention of any one of the fifth to seventh aspects, the remote control prevention device includes an operation button for permitting supply of a current to the outlet, and the current control unit makes valid a current supply command from the center server when an actual operation to operate the operation button is performed by a user and an operation signal of the operation button is received.

A public power supply system according to the invention of the ninth aspect is characterized in that, in the invention of any one of the fifth to seventh aspects, the remote control prevention device includes an information input device for inputting specific information to permit supply of a current to the outlet, and the current control unit makes valid a current supply command from the center server when an actual operation to input specific information from the information input device is performed by a user and specific information input from the information input device is received.

A public power supply system according to the invention of the tenth aspect is characterized in that, in the invention of any one of the fifth to seventh aspects, the remote control prevention device includes a reading unit configured to read a new identification marker transmitted to the communication terminal from the center server, and the current control unit makes valid a current supply command from the center server when an actual operation to cause the reading unit to read the new identification marker transmitted from the reading unit is performed by a user and a new identification marker is received from the reading unit.

A public power supply system according to the invention of the eleventh aspect is characterized in that, in the invention of any one of the first to tenth aspects, the center server transmits information of the outlet installation location to the communication terminal when there is a request by the user to search for the outlet installation location from the communication terminal.

A public power supply system according to the invention of the twelfth aspect is characterized in that, in the invention of the eleventh aspect, the center server provides detailed information of the use of the outlet for each installation location in addition to information of the outlet installation location.

A public power supply system according to the invention of the thirteenth aspect is characterized in that, in the invention of any one of the first to twelfth aspects, the center server totalizes the time of use of the outlet, the amount of power used, and the use charge for each of the users.

A public power supply system according to the invention of the fourteenth aspect is characterized in that, in the invention of the thirteenth aspect, the center server totalizes and stores the use charge calculated by multiplying the charge for each installation location by the time of use or the use charge calculated by multiplying the charge for each installation location by the amount of power used.

A public power supply system according to the invention of the fifteenth aspect is characterized in that, in the invention of the thirteenth or fourteenth aspect, the center server provides information of the time of use of the outlet, the amount of power used, and the use charge totalized for each of the users to the communication terminal when there is a request by the user for inquiry about the use charge from the communication terminal.

A public power supply system according to the invention of the sixteenth aspect is characterized in that, in the invention of any one of the first to fifteenth aspects, the current control unit blocks a current from the distribution line when detecting an electric leakage in the lower system of the distribution line.

A public power supply system according to the invention of the seventeenth aspect is characterized in that, in the invention of any one of the first to sixteenth aspects, the current control unit blocks a current from the distribution line when a supply current to the outlet exceeds an overcurrent set value determined in advance.

A public power supply system according to the invention of the eighteenth aspect is characterized in that, in the invention of the seventeenth aspect, the center server is capable of changing the setting of the overcurrent set value of the current control unit.

A public power supply system according to the invention of the nineteenth aspect is characterized in that, in the invention of any one of the first to eighteenth aspects, the current control unit has a use time limit value storage unit configured to set a limit value of the time of use of the outlet and a timer configured to turn off current supplied to the outlet when the time of use of the outlet reaches the limit value set in the use time limit value storage unit and the center server outputs a count start command of the timer as well as a current supply command of the outlet.

A public power supply system according to the invention of the twentieth aspect is characterized in that, in the invention of any one of the first to eighteenth aspects, the center server has a use time limit value storage unit configured to set a limit value of the time of use of the outlet and a timer configured to turn off current supplied to the outlet when the time of use of the outlet reaches the limit value set in the use time limit value storage unit and outputs a count start command of the timer as well as a current supply command of the outlet.

A public power supply system according to the invention of the twenty-first aspect is characterized in that, in the invention of any one of the first to twentieth aspects, the current control unit supplies AC current supplied from the distribution line to the outlet and at the same time, converts the AC current into DC current and supplies the converted DC current to a DC outlet.

A public power supply system according to the invention of the twenty-second aspect is characterized in that, in the invention of any one of the first to twenty-first aspects, a communication network connecting the current control unit and the center server is the Internet or a communication network using a protocol other than the Internet protocol.

Advantageous Effects of Invention

According to the invention of the first aspect, when there is a request by a user for power supply to the outlet from the communication terminal, the center server outputs a current supply command to the current control unit when receiving information to allow supply of a current to the outlet from the remote control prevention device generated by the actual operation of the user, and therefore, the current supply command is output after the operation in the outlet installation location is performed, without fail, and thus, it is possible to prevent a current from being supplied to the outlet by remote control apart from the outlet.

According to the invention of the second aspect, in addition to the effect of the invention of the first aspect, the center server outputs a current supply command to the current control unit when user specifying information read by the user specifying information reader provided near the outlet is user-registered, and therefore, it is made possible for the user to use power in a public location not in the customer site also by the user specifying information besides the communication terminal.

According to the invention of the third aspect, in addition to the effect of the invention of the second aspect, when a user holds up the contactless IC card over the contactless IC card reader provided near the outlet, the center server outputs a current supply command to the current control unit if the contactless IC card read by the contactless IC card reader is user-registered, and thus, it is made possible for the user to use power in a public location not in the customer site also by the contactless IC card.

According to the invention of the fourth aspect, in addition to the effect of the invention of any one of the first to third aspects, the center server determines that information to allow supply of a current is received when receiving a variable identification marker displayed on the display device installed near the outlet from the communication terminal, and therefore, in order to generate information to allow supply of a current, the operation in the outlet installation location is required without fail. Consequently, .it is possible to prevent a current from being supplied to the outlet by remote control apart from the outlet.

According to the invention of the fifth aspect, when there is a request by a user for power supply to the outlet from the communication terminal, the center server outputs a current supply command to the current control unit in advance and the current control unit makes valid the current supply command from the center server when receiving information to allow supply of a current generated by the actual operation of the user from the remote control prevention device installed near the outlet, and therefore, the current supply command is output after the operation in the outlet installation location is performed, without fail, and thus, it is possible to prevent a current from being supplied to the outlet by remote control apart from the outlet.

According to the invention of the sixth aspect, in addition to the effect of the invention of the fifth aspect, the center server outputs a current supply command to the current control unit when the user specifying information read by the user specifying information reader provided near the outlet is user-registered, and thus, it is made possible for the user to use power in a public location not in the customer site also by the user specifying information besides the communication terminal.

According to the invention of the seventh aspect, in addition to the effect of the invention of the fifth aspect, when a user holds up the contactless IC card over the contactless IC card reader provided near the outlet, the center server outputs a current supply command to the current control unit if the contactless IC card read by the contactless IC card reader is user-registered, and thus, it is made possible for the user to use power in a public location not in the customer site also by the contactless IC card.

According to the invention of the eighth aspect, in addition to the effect of the invention of any one of the fifth to seventh aspects, the current control unit makes valid the current supply command from the center server when receiving the operation signal of the operation button installed near the outlet, and thus, in order to generate information to allow supply of a current, the operation in the outlet installation location is required without fail, and thus, it is possible to prevent a current from being supplied to the outlet by remote control apart from the outlet.

According to the invention of the ninth aspect, in addition to the effect of the invention of any one of the fifth to seventh aspects, the current control unit makes valid the current supply command from the center server when receiving specific information input from the information input device, and therefore, in order to generate information to allow supply of a current, the operation in the outlet installation location is required without fail, and thus, it is possible to prevent a current from being supplied to the outlet by remote control apart from the outlet.

According to the invention of the tenth aspect, in addition to the effect of the invention of any one of the fifth to seventh aspects, when the center server receives the fixed identification marker, the reading unit installed near the outlet is caused to read a new identification marker transmitted to the communication terminal from the center server and the current control unit makes valid the current supply command from the center server when receiving a new identification marker from the reading unit, and thus, in order to generate information to allow supply of a current, the operation in the outlet installation location is required without fail, and thereby, it is possible to prevent current from being supplied to the outlet by remote control apart from the outlet.

According to the invention of the eleventh aspect, in addition to the effect of the invention of any one of the first to tenth aspects, the outlet is installed in advance in a predetermined public location and when there is a request by a user to search for the outlet installation location from the communication terminal, the center server transmits information of the outlet installation location to the communication terminal, and thus, it is possible for the user to easily grasp the outlet installation location and convenience is improved.

According to the invention of twelfth aspect, in addition to the effect of the invention of the eleventh aspect, the center server provides detailed information of the use of the outlet for each installation location in addition to the information of the outlet installation location, and thus, for the user, the convenience of the use of the outlet is further improved.

According to the invention of the thirteenth aspect, in addition to the effect of the invention of any one of the first to twelfth aspects, the center server totalizes and stores the time of use of the outlet, the amount of power used, and the use charge for each user, and thus, it is possible to store the totalization of the time of use, the amount of power used, and further the charging for each user.

According to the invention of the fourteenth aspect, in addition to the effect of the invention of the thirteenth aspect, the use charge calculated by multiplying the charge for each installation location by the time of use or the use charge calculated by multiplying the charge for each installation location by the amount of power used is totalized and stored, and thus, it is possible to charge differently for each installation location.

According to the invention of the fifteenth aspect, in addition to the effect of the invention of the fourteenth aspect, when there is a request for inquiry about the time of use of the outlet, the amount of power used, and the use charge from the communication terminal, the center server provides information of charge of the amount of power used totalized for each user, and thus, it is possible for the user to easily grasp the information of the charge of the power used.

According to the invention of the sixteenth aspect, in addition to the effect of the invention of any one of the first to fifteenth aspects, the current control unit blocks a current from the distribution line when detecting an electric leakage in the lower system of the distribution line, and thus, it is possible to supply power to the outlet safely.

According to the invention of the seventeenth aspect, in addition to the effect of the invention of any one of the first to sixteenth aspects, the current control unit blocks a current from the distribution line when the current supplied to the outlet exceeds an overcurrent set value determined in advance, and thus, it is possible to prevent other customers of the distribution line to which the outlet is connected and the upper system from being affected adversely and to supply power to the outlet safely.

According to the invention of the eighteenth aspect, in addition to the effect of the invention of the aspect, it is possible for the center server to change the setting of the overcurrent set value of the current control unit, and thus, it is possible to easily deal with the change in the capacity of the outlet installed in a predetermined public location.

According to the inventions of the nineteenth aspect and the twelfth aspect, in addition to the effect of the invention of any one of the first to eighteenth aspects, when the time of use of the outlet reaches the limit value thereof, the current supplied to the outlet is turned off, and thus, it is possible to automatically turn off the current even if the user of the outlet leaves the state where an electric appliance is erroneously connected for a long time and safety is improved.

According to the invention of the twenty-first aspect, in addition to the effect of the invention of any one of the first to twentieth aspects, an AC current is converted into a DC current and the converted DC current is supplied directly to the DC outlet, and thus, it is also possible to supply power to a DC load.

According to the invention of the twenty-second aspect, in addition to the effect of the invention of any one of the first to twenty-first aspects, the communication network connecting the current control unit and the center server is the Internet or a communication network using a protocol other than the Internet protocol, and thus, it is possible to switch the communication network to a more appropriate one depending on the size of communication data between the current control unit and the center server.

DESCRIPTION OF EMBODIMENTS

Figure 1:
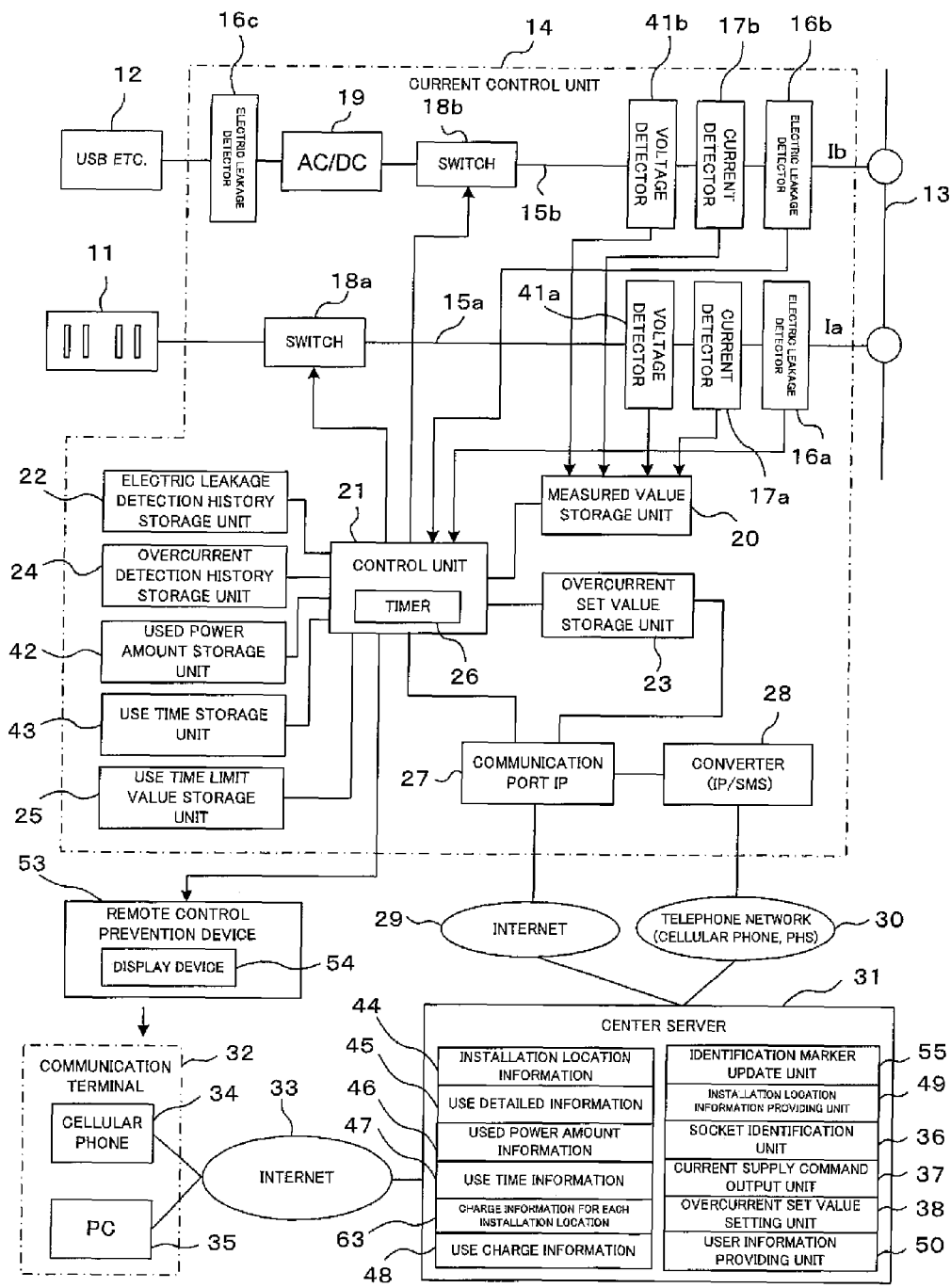
FIG. 1 a configuration diagram of example 1 of a public power supply system according to an embodiment of the present invention.

Hereinafter, embodiments of the present invention are explained. FIG. 1 is a configuration diagram of example 1 of a public power supply system according to an embodiment of the present invention. In a predetermined public location, an outlet 11 configured to supply AC power is installed in advance. Further, a DC outlet 12 is also installed in accordance with necessity. FIG. 1 shows a case where the DC outlet 12 is a USB terminal to which a terminal device of mobile equipment, such as a personal computer and cellular phone, is connected. A predetermined public location is, for example, a park, public facility, convenience store, etc., and is installed as a power supply corner and power supply stand.

To the outlet 11 and the DC outlet 12, power is supplied from a distribution line 13 via a current control unit 14. The current control unit 14 controls whether or not to supply a current to be supplied to the outlet 11 and the DC outlet 12. To the outlet 11, AC power is supplied from the distribution line 13 through an electric wire 15a and to the DC outlet 12, AC power converted into DC power by an AC/DC converter 19 is supplied from the distribution line 13 through an electric wire 15b.

The electric wire 15a of the outlet 11 is provided with an electric leakage detector 16a configured to detect an electric leakage of the electric wire 15a, a current detector 17a configured to detect a current flowing through the electric wire 15a, and a voltage detector 41a configured to detect the voltage of the electric wire 15a, and is further provided with a switch 18a configured to turn on and off a current Ia flowing through the electric wire 15a. Similarly, the electric wire 15b of the DC outlet 12 is provided with an electric leakage detector 16b configured to detect an electric leakage of the electric wire 15b, a current detector 17b configured to detect a current flowing through the electric wire 15b, a voltage detector 41b configured to detect the voltage of the electric wire 15b, and a switch 18b configured to turn on and off a current Ib flowing through the electric wire 15b, and further, is provided with the AC/DC converter 19 configured to convert AC power input via the switch 18b into DC power and to output the DC power to the DC outlet 12 and an electric leakage detector 16c. The electric leakage detector 16c is configured to detect an electric leakage in a DC circuit. It may also be possible to provide the switch 18b between the DC outlet 12 and the AC/DC converter 19. The currents Ia and Ib detected by the current detectors 17a and 17b and voltages Va and Vb detected by the voltage detectors 41a and 41b are input to and stored in a measured value storage unit 20, respectively.

The electric leakage detectors 16a and 16b are configured to detect an electric leakage in the lower system of the distribution line 13 and to detect an electric leakage in circuits ahead of the electric wires 15a and 15b and the outlet 11 and the DC outlet 12, which are circuits to supply power to the outlet 11 and the DC outlet 12. When an electric leakage in the electric wire 15a of the outlet 11 and in the electric wire 15b of the DC outlet 12 is detected, a control unit 21 is notified of the occurrence of the electric leakage. Upon receipt of the notification of the occurrence of electric leakage from the electric leakage detectors 16a and 16b, the control unit 21 opens the switches 18a and 18b to stop supply of power to the outlet 11 and the DC outlet 12 and at the same time, stores information, such as the date and time of the occurrence of electric leakage, in an electric leakage history storage unit 22 as a history.

The control unit 21 controls supply of current to the outlet 11 and the DC outlet 12. When permitting supply of current, the control unit 21 closes the switches 18a and 18b and opens the switches 18a and 18b when not permitting supply of current. In an overcurrent set value storage unit 23, limit values of the currents Ia and Ib to be supplied to the outlet 11 and the DC outlet 12 are stored in advance as overcurrent set values.

The control unit 21 inputs the currents Ia and Ib stored in the measured value storage unit 20 and monitors whether or not the currents Ia and Ib supplied to the outlet 11 and the DC outlet 12 exceed the overcurrent set values stored in the overcurrent set value storage unit 23 and opens the switches 18a and 18b to block the currents Ia and Ib from the distribution line 13 when the overcurrent set values are exceeded and at the same time, stores information, such as the date and time of the overcurrent detection and overcurrent values, in an overcurrent detection history storage unit 24 as a history.

Due to this, it is made possible to prevent the currents Ia and Ib supplied to the outlet 11 and the DC outlet 12 from becoming overcurrents and to prevent other customers of the distribution line to which the outlet is connected and the upper system from being affected adversely and at the same time, to safely supply power to the outlet 11 and the DC outlet 12.

Further, the current control unit 14 is provided with a use time limit value storage unit 25 configured to set a limit value of the time of use of the outlet 11 and the DC outlet 12. The control unit 21 opens the switches 18a and 18b to stop supply of current when the time of use of the outlet 11 and the DC outlet 12 reaches the limit value of the time of use set in the use time limit value storage unit 25.

That is, the control unit 21 has a timer 26 and activates the timer 26 when the use of the outlet 11 and the DC outlet 12 is started and counts the time of use of the outlet 11 and the DC outlet 12. Then, when the time of use counted by the timer 26 reaches the limit value thereof, the control unit 21 opens the switches 18a and 18b to turn off the current to be supplied to the outlet 11 and the DC outlet 12. Due to this, it is possible to automatically turn off the current even if a user of the outlet does not stop the use of the outlet 11 and the DC outlet 12 and leaves the state where an electric appliance is erroneously connected for a long time, and therefore, safety is improved.

Further, the control unit 21 calculates the amount of power used in the outlet 11 and the DC outlet 12 based on the currents Ia and Ib and the voltages Va and Vb stored in the measured value storage unit 20 and stores it in a used power amount storage unit 42 and at the same time, calculates the time of use of the outlet 11 and the DC outlet 12 and stores it in a use time storage unit 43. The time of use is acquired by calculating the time during which the switches 18a and 18b are closed.

The current control unit 14 has a communication port 27 and a converter 28 and the communication port 27 and the converter 28 receive a request for power supply to the outlet 11 and the DC outlet 12 transmitted from a center server 31 via an Internet 29 and a telephone network 30 and outputs the request to the control unit 21 and at the same time, transmits the use circumstances of the outlet 11 and the DC outlet 12, the amount of power used and the time of use of a user to the center server 31 via the Internet 29 and the telephone network 30. The use circumstances of the outlet 11 and the DC outlet 12 are the number of outlets 11 and the DC outlets 12 currently used by a user and the like.

A communication network connecting the current control unit 14 and the center server 31 is the Internet 29 or the telephone network 30, which is a communication network using a protocol other than the Internet protocol, and in the Internet 29, transmission is performed using the Internet protocol and in the telephone network 30, transmission is performed using a protocol other than the Internet protocol. For example, the telephone network 30 is the communication network of a cellular phone and PHS, SMS (short message service), etc. In the case of transmission by the telephone network 30, the protocol is converted into the Internet protocol by the converter 28 and then output to the communication port 27. Switching between the Internet 29 and the telephone network 30 is performed so that a more appropriate network is selected depending on the size of the communication data between the current control unit 14 and the center server 31.

The center server 31 is connected to a communication terminal 32 via an Internet 33. The communication terminal 32 is, for example, a cellular phone 34 and a personal computer 35 and when using the outlet 11 and the DC outlet 12, a request to search for the installation location of the outlet 11 and the DC outlet 12, a request for power supply, and further, a request to inquire the amount of power used, the time of use, the use charge, etc., are made to the center server 31 from the communication terminal 32 via the Internet 33.

Further, near the outlet 11 and the DC outlet 12, a remote control prevention device 53 is installed. The remote control prevention device 53 is configured to perform the operation to permit supply of the currents Ia and Ib to the outlet 11 and the DC outlet 12 and it is designed so that the currents Ia and Ib cannot be supplied to the outlet 11 and the DC outlet 12 unless the operation to allow supply of a current is performed using the remote control prevention device 53 in the installation location of the outlet 11 and the DC outlet 12. That is, the remote control prevention device 53 is configured to generate information to allow supply of a current to the outlet by the actual operation of a user.

The remote control prevention device 53 has a display device 54 configured to display a variable identification marker for identifying the outlet 11 and the DC outlet 12 and the display of the variable identification marker is updated by the control unit 21 each time the outlet 11 and the DC outlet 12 are used. The variable identification marker displayed on the display unit 54 is read by the communication terminal 32 and transmitted to the center server 31 via the Internet 33.

The center server 31 stores installation location information 44 indicative of the location where the outlet 11 and the DC outlet 12 are installed, use detailed information 45 indicative of the use circumstances of the outlet 11 and the DC outlet 12 in each installation location, used power amount information 46 acquired by totalizing the amount of power used for each user, use time information 47 acquired by totalizing the time of use for each user, charge information for each installation location 63 determined in advance for each installation location of the outlet 11 and the DC outlet 12, and a use charge information 48 acquired by totalizing the use charge for each user in the storage device as information. The center server 31 multiplies the charge for each installation location stored in the charge information for each installation location 63 by the time of use or the amount of power used of a user and stores the use charge for each user as the use charge information 48.

Further, the center server 31 has an identification marker update unit 55 configured to update the variable identification marker displayed on the display device 54 of the remote control prevention device 53, an installation location information providing unit 49 configured to provide the installation location information 44 and the use detailed information 45 to the communication terminal 32 when a request is made to search for the installation location of the outlet 11 and the DC outlet 12, an outlet identification unit 36 configured to determine the identification marker of the outlet 11 and the DC outlet 12 installed in a predetermined public location, a current supply command output unit 37 configured to output a current supply command to the current control unit 14 when a user makes a request for power supply to the outlet 11 and the DC outlet 12, an overcurrent set value setting unit 38 configured to set an overcurrent set value to the overcurrent set value storage unit 23 of the current control unit 14, and a user information providing unit 50 configured to provide the used power amount information 46, the use time information 47, and the use charge information 48 to the communication terminal 32 when a user makes a request to inquire the user information of the outlet 11 and the DC outlet 12 (the amount of power used, the time of use, the use charge).

Each time the identification marker is read by the communication terminal 32 and transmitted via the Internet 33, the identification marker update unit 55 of the center server 31 updates the identification marker and transmits a new identification marker to the control unit 21 of the current control unit 14. Due to this, the control unit 21 of the current control unit 14 displays the updated identification marker on the display device 54 of the remote control prevention device 53. Due to this, on the display device 54 of the remote control prevention device 53, the variable identification marker is displayed as a result.

When there is a request by a user to search for the installation location of the outlet 11 and the DC outlet 12 from the communication terminal 32, the installation location information providing unit 49 of the center server 31 transmits the installation location information 44 of the outlet 11 and the DC outlet 12 and the use detailed information 45 of the outlet 11 and the DC outlet 12 for each installation location to the communication terminal 32. For example, as the installation location information 44, the installation location nearest to the location of the communication terminal 32 is provided and as the use detailed information 45, information about whether or not the outlet 11 and the DC outlet 12 are in use is provided.

The outlet identification unit 36 of the center server 31 inputs the variable identification marker displayed on the display device 54 of the remote control prevention device 53 transmitted from the communication terminal 32, determines whether the identification marker is the most recent one transmitted from the identification marker update unit 55, and determines that there is information to allow supply of a current when the identification marker is the most recent one and at the same time, identifies the outlet 11 and the DC outlet 12 to which a current is to be supplied based on the identification marker.

Then, the current supply command output unit 37 determines whether the request is a request made by a user from the communication terminal 32 for power supply to the outlet 11 and the DC outlet 12 and when the authentication of the user can be confirmed, outputs a current supply command to the current control unit 14 corresponding to the outlet 11 and the DC outlet 12 identified by the outlet identification unit 36 via an Internet 24 or a telephone network 25.

When the outlet 11 and the DC outlet 12 are newly installed in a predetermined public location or when the capacity is changed after the installation, the overcurrent set value setting unit 38 of the center server 31 transmits an overcurrent set value to the overcurrent set value storage unit 23 of the current control unit 14 via the Internet 29 or the telephone network 30 and changes the setting of the overcurrent set value. Due to this, it is possible to easily change the overcurrent set value without the need to go to the installation location of the outlet 11 and the DC outlet 12.

When there is an inquiry from a user about the user information (the amount of power used, the time of use, the use charge), the user information providing unit 50 of the center server 31 provides the used power amount information 46, the use time information 47, and the use charge information 48 of the user to the communication terminal 32, and therefore, it is possible for the user to easily grasp the information of the amount of power used, the time of use, and the use charge of the user.

Figure 2:
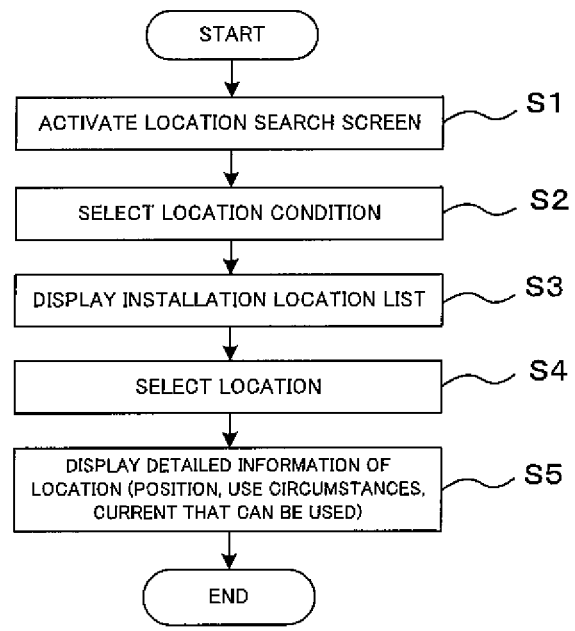
FIG. 2 is a flowchart showing the operation of an installation location information providing unit of a center server in the example 1 of the public power supply system according to the embodiment of the present invention.

FIG. 2 is a flowchart showing the operation of the installation location information providing unit 49 of the center server 31. The installation location information providing unit 49 is activated when a request is made to search for the installation location of the outlet 11 and the DC outlet 12 from the communication terminal 32. First, the installation location information providing unit 49 activates a location search screen (S1) and transmits the screen to the communication terminal 32 via the Internet 33. The installation location information providing unit 49 waits for a selection of location condition by a user who is going to use the outlet and when the user who is going to use the outlet makes a selection of location condition (S2), the installation location information providing unit 49 transmits an installation location list of the public power supply system to the communication terminal 32 via the Internet 33 and displays the list on the communication terminal 32 (S3).

The installation location information providing unit 49 waits for a selection of location by the user who is going to use the outlet and when the user who is going to use the outlet makes a selection of location (S4), the installation location information providing unit 49 transmits the use detailed information of the outlet 11 and the DC outlet 12 in the selected installation location to the communication terminal 32 via the Internet 33 and displays the information on the communication terminal 32 (S5). As the use detailed information, the position of the installation location, use circumstances including information about whether or not the outlet is in use, the maximum current that can be used, etc., are displayed. Due to this, the user who is going to use the outlet may easily determine, for example, an outlet in which installation location provides a more effective use.

After searching for a public power supply system through the installation location information providing unit 49 of the center server 31 as described above, the user who is going to use the outlet actually goes to the installation location in which the outlet 11 and the DC outlet 12 are installed and uses the outlet 11 and the DC outlet 12.

Figure 3:
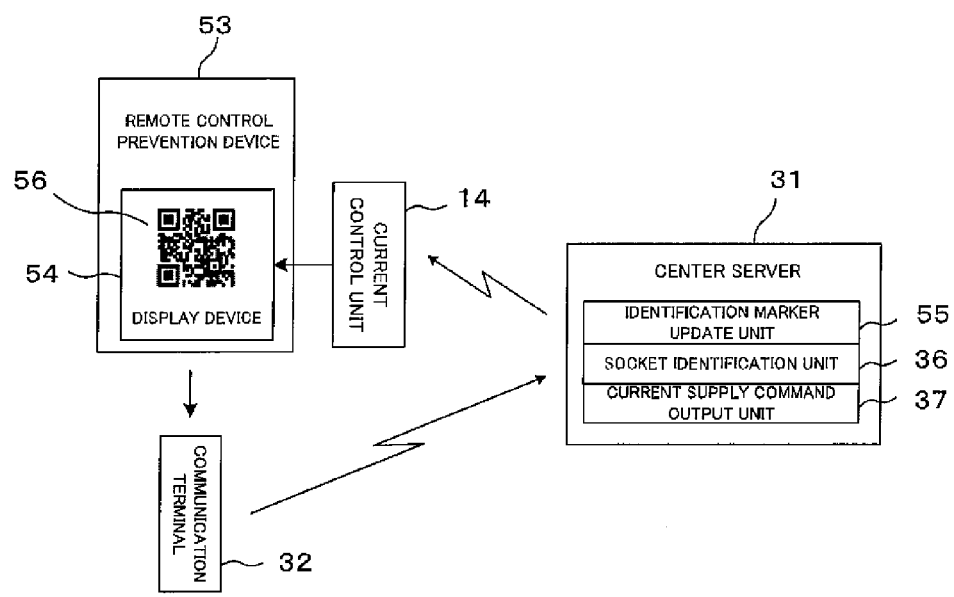
FIG. 3 is an explanatory diagram of the operation to make a request for power supply by a communication terminal in an installation location of an outlet and DC outlet in the example 1 of the public power supply system according to the embodiment of the present invention.

FIG. 3 is an explanatory diagram of the operation to make a request for power supply by the communication terminal 32 in the installation location of the outlet 11 and the DC outlet 12 in the example 1. In the installation location of the outlet 11 and the DC outlet 12, the remote control prevention device 53 is provided near the outlet 11 and the DC outlet 12. The remote control prevention device 53 is provided with the display device 54 configured to display the variable identification marker for identifying the outlet 11 and the DC outlet 12 and on the display device 54, a variable identification marker 56 for identifying the outlet 11 and the DC outlet 12 is displayed. FIG. 3 shows a case where the variable identification marker 56 is a QR code. As described previously, the variable identification marker 56 is updated by the identification marker update unit 55 of the center server 31 and the display thereof is updated by the control unit 21 each time the outlet 11 and the DC outlet 12 are used.

When intending to use the outlet 11 and the DC outlet 12 in this installation location, a user reads the variable identification marker 56 by the communication terminal 32 and transmits it to the center server 31. The center server 31 inputs the variable identification marker 56 to the outlet identification unit 36. The outlet identification unit 36 identifies the outlet 11 and the DC outlet 12 to which current is to be supplied based on the variable identification marker 56 and at the same time, determines whether the identification marker is the most recent one transmitted from the identification marker update unit 55 and determines that there is information to allow supply of a current when the identification marker is the most recent one.

Further, the current supply command output unit 37 of the center server 31 checks whether the request for power supply from the communication terminal 32 is authenticated by the user and when authentication thereof can be confirmed, outputs a current supply command to the current control unit 14 corresponding to the outlet 11 and the DC outlet 12 identified by the outlet identification unit 36. Due to this, power is supplied to the outlet 11 and the DC outlet 12.

Figure 4:
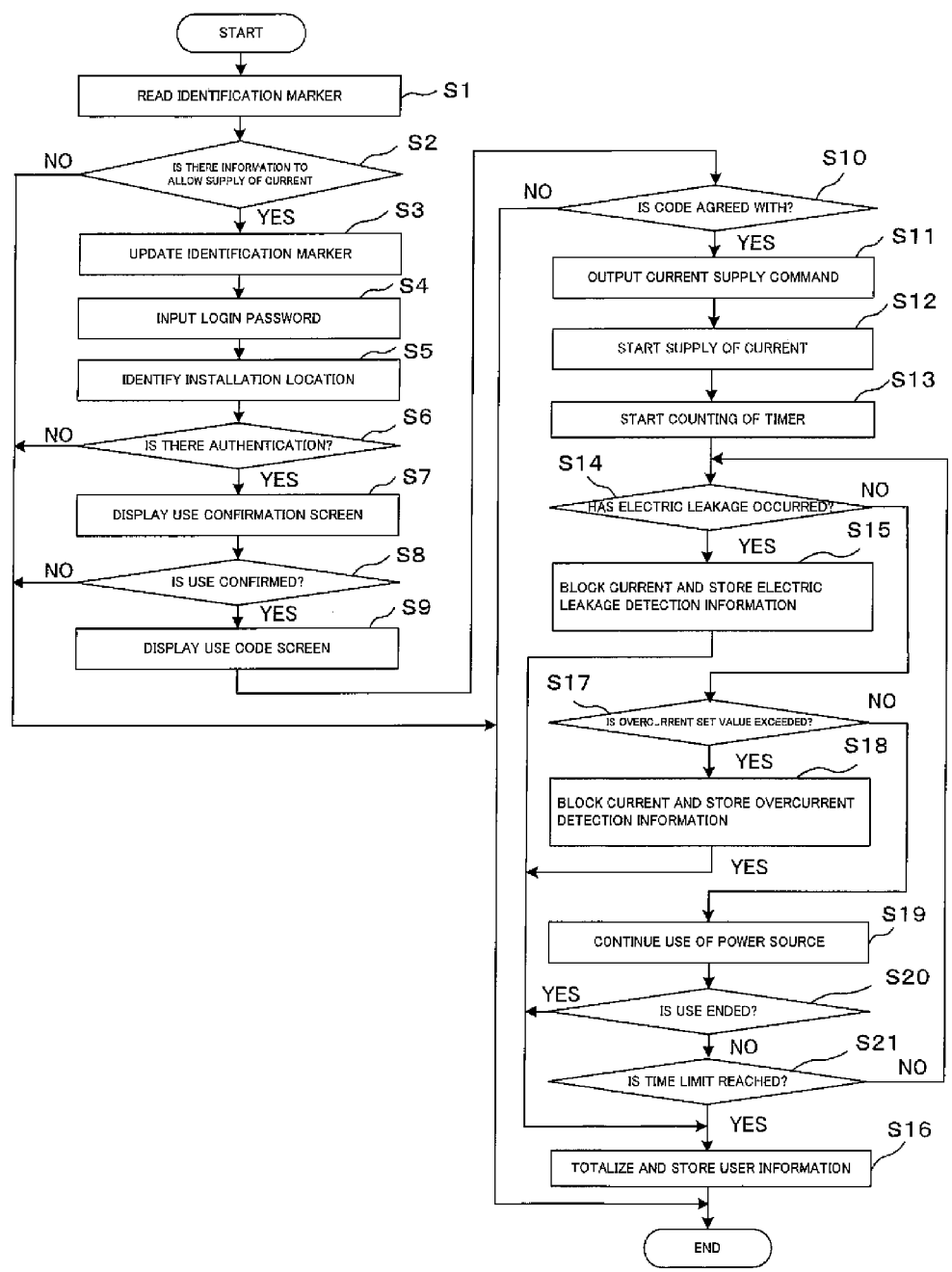
FIG. 4 is a flowchart showing the operation of the example 1 of the public power supply system according to the embodiment of the present invention.

FIG. 4 is a flowchart showing the operation of the example 1 of the public power supply system according to the embodiment of the present invention. First, a user goes to the installation location of the outlet 11 and the DC outlet 12 that the user intends to use and reads the variable identification marker 56 displayed on the display device of the remote control prevention device 53 in the installation location by the communication terminal 32 (S1). The center server 31 determines whether there is information to allow supply of a current based on the variable identification marker 56 transmitted from the communication terminal 32 (S2). This determination is made by determining whether the variable identification marker 56 is the most recent one and when the variable identification marker 56 is the most recent one, it is determined that there is information to allow supply of a current (S2). Then, the center server 31 updates the identification marker (S3) and transmits a new identification marker to the control unit 21 of the current control unit 14. Due to this, the control unit 21 of the current control unit 14 displays the updated identification marker on the display device 54 of the remote control prevention device 53.

When the user inputs a login password (S4), the center server 31 identifies the installation location of the outlet 11 and the DC outlet 12 to which current is to be supplied based on the variable identification marker 56 (S5) and at the same time, checks whether there is authentication based on the login password (S6). When authentication cannot be confirmed, the processing is terminated.

On the other hand, when authentication can be confirmed, the center server 31 displays a use confirmation screen on the communication terminal 32 (S7) and checks whether the user has an intention to use the outlet 11 and the DC outlet 12 (S8). When the user does not confirm the use, the processing is terminated and when the user confirms the use, the center server 31 displays a use code screen on the communication terminal 32 (S9) and checks whether the user agrees with the use code (S10).

When the user agrees with the code, the center server 31 outputs a current supply command to the current control unit 14 (S11). This is because it has already been determined that there is information to allow supply of a current in step S2. Upon receipt of the current supply command, the current control unit 14 starts to supply a current (S12) and at the same time, activates the timer 26 and starts counting of the timer 26 (S13). Due to this, the time of use of the outlet 11 and the DC outlet 12 is measured.

Next, the current control unit 14 determines whether an electric leakage has occurred by the electric leakage detectors 16a and 16b (S14) and when an electric leakage has occurred, the electric leakage detectors 16a and 16b open the switches 18a and 18b to block the current supplied to the outlet 11 and the DC outlet 12 and at the same time, the current control unit 14 stores electric leakage detection information in the electric leakage detection history storage unit 22 (S15) and further, totalizes and stores the user information (the amount of power used, the time of use, the use charge) up to that time (S16) and terminates the processing.

When no electric leakage has occurred, the control unit 21 determines whether the current supplied to the outlet 11 and the DC outlet 12 exceeds the overcurrent set value (S17) and when the overcurrent set value is exceeded, the control unit 21 opens the switches 18a and 18b to block the current supplied to the outlet 11 and the DC outlet 12 and at the same time, stores overcurrent detection information in the overcurrent detection history storage unit 24 (S18) and further, totalizes and stores the user information (the amount of power used, the time of use, the use charge) up to that time (S16) and terminates the processing.

When the overcurrent set value is not exceeded, the use of the power source is continued (S19) and the control unit 21 determines whether the use is ended (S20) and when the use is ended, totalizes and stores the user information (the amount of power used, the time of use, the use charge) up to that time (S16) and terminates the processing. When the use of the outlet 11 and the DC outlet 12 is not ended yet, the control unit 21 determines whether the time of use measured by the timer 26 reaches or exceeds the limit value stored in the use time limit value storage unit 25 (S21) and when the time limit is not reached, the process returns to step S14 and when the time limit is reached, the control unit 21 totalizes and stores the user information (the amount of power used, the time of use, the use charge) up to that time (S16) and terminates the processing. Whether the use is ended or not is determined based on whether or not an end command is output from the communication terminal 32 or whether or not the currents Ia and Ib supplied to the outlet 11 and the DC outlet 12 are zero for a period of time equal to or longer than a predetermined period of time.

The electric leakage detection history information, such as the date and time of the occurrence of electric leakage stored in the electric leakage detection history storage unit 22, and overcurrent detection history information, such as the date and time of overcurrent detection and the overcurrent value stored in the overcurrent detection history storage unit 24, are transmitted to the center server 31 upon request from the center server 31 and are managed in the center server 31.

In the above explanation, the use time limit value storage unit 25 configured to set a limit value of the time of use of the outlet 11 and the DC outlet 12 and the timer 26 used to turn off the current supplied to the outlet 11 and the DC outlet 12 when the time of use of the outlet 11 and the DC outlet 12 reaches the limit value set in the use time limit value storage unit 25 are provided in the current control unit 14, but, it may also be possible to provide them in the center server 31. In this case, when the count value of the timer 26 reaches the limit value set in the use time limit value storage unit 25, the center server 31 notifies the control unit 21 of the current control unit 14 of that.

Further, a fixed value may be set in advance for the limit value of the time of use set in the use time limit value storage unit 25, or the center server 31 may make an inquiry to a user about the limit time of the time of use through the communication terminal 32, and thus, a user may set a specified limit value from the communication terminal 32.

As described above, according to the example 1, the outlet 11 and the DC outlet 12 are installed in advance in a predetermined public location and when a user makes a request for power supply to the outlet 11 and the DC outlet 12 from the communication terminal 32, the center server 31 outputs a current supply command to the current control unit 14 when receiving information to allow supply of a current generated using the remote control prevention device 53 installed near the outlet 11 and the DC outlet 12, and therefore, the current supply command is output after the operation in the installation location of the outlet 11 and the DC outlet 12 is performed, without fail, and thus, it is possible to prevent a current from being supplied to the outlet 11 and the DC outlet 12 by remote control apart from the outlet 11 and the DC outlet 12. Due to this, a user may use power without erroneous operation in a public location not in a customer site, and thus, convenience is improved.

Further, when a user makes a request to search for the installation location of the outlet 11 and the DC outlet 12 from the communication terminal 32, the center server 31 transmits the information of the installation location of the outlet 11 and the DC outlet 12 to the communication terminal 32, and therefore, the user may easily grasp the installation location of the outlet 11 and the DC outlet 12 and convenience is improved. Furthermore, the center server 31 provides detailed information of the use of the outlet 11 and the DC outlet 12 for each installation location, in addition to the information of the installation location of the outlet 11 and the DC outlet 12, and therefore, for the user, the convenience of the use of the outlet 11 and the DC outlet 12 is further improved.

When the time of use of the outlet reaches the limit value thereof, the current control unit 14 turns off the current supplied to the outlet 11 and the DC outlet 12, and therefore, even if a user leaves the state where the user of the outlet erroneously connects an electric appliance for a long time, the current can be automatically turned off, and safety is improved.

Since the center server 31 totalizes the user information (the amount of power used, the time of use, the use charge) for each user, it is possible to easily totalize the amount of power used, the time of use, and the use charge and also to easily totalize the charging. When a user makes a request for an inquiry about the user information (the amount of power used, the time of use, the use charge) from the communication terminal 32, the center server 31 provides information of the charge for used power totalized for each user to the communication terminal, and thus the user may easily grasp the user information (the amount of power used, the time of use, the use charge).

Further, the current control unit 14 monitors the current supplied to the outlet 11 and the DC outlet 12 and supplies a current to the outlet 11 and the DC outlet 12 so as not to exceed the overcurrent set value determined in advance, and therefore, it is possible to safely supply a current to the outlet 11 and the DC outlet 12 and to prevent the distribution line to which the outlet 11 and the DC outlet 12 are connected and the upper system from being affected adversely. Furthermore, since the setting of the overcurrent set value of the current control unit 14 can be changed from the center server 31, it is possible to easily deal with the change in the capacity of the outlet 11 and the DC outlet 12.

Figure 5:
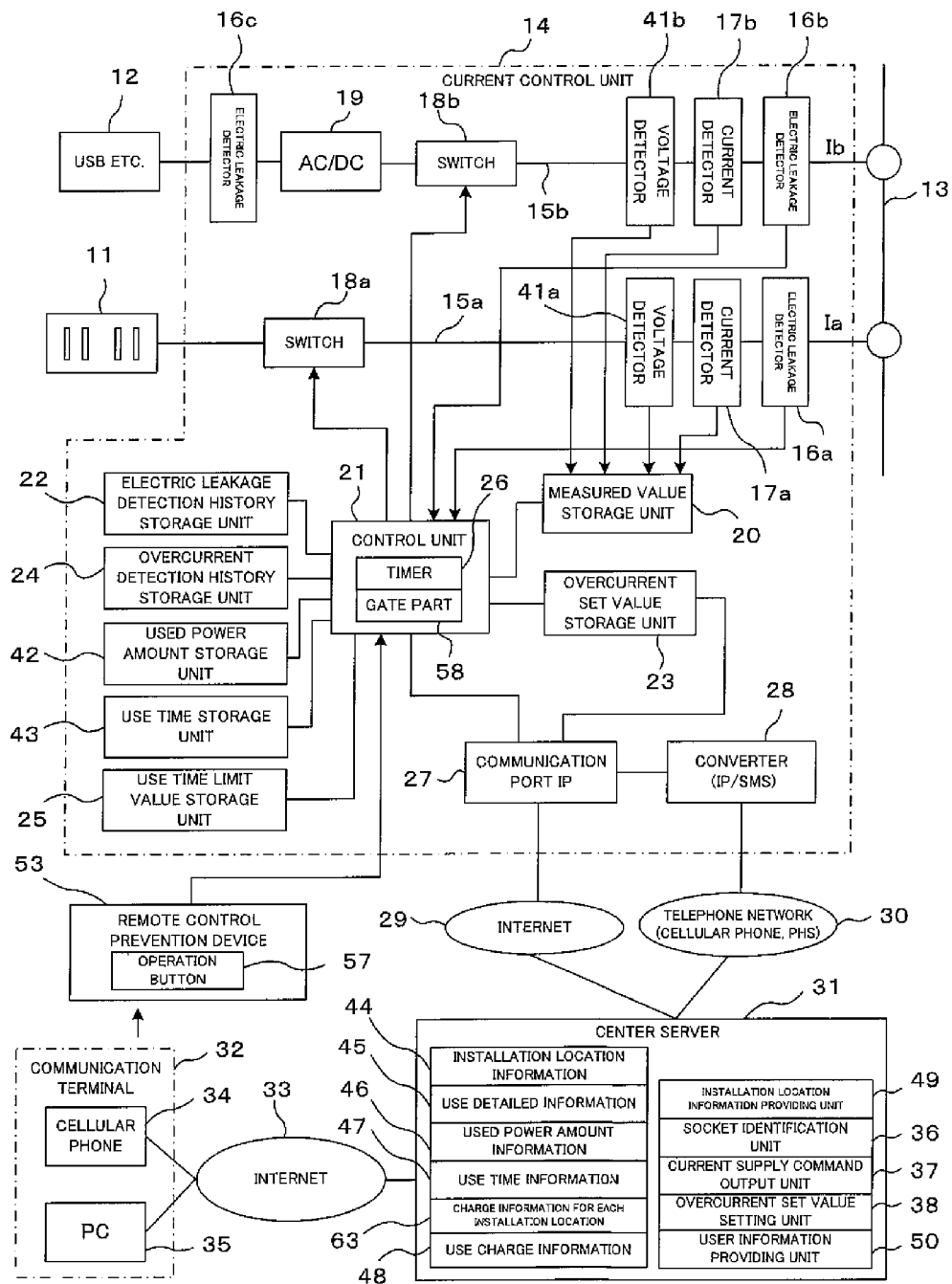
FIG. 5 is a configuration diagram of example 2 of a public power supply system according to an embodiment of the present invention.

Next, example 2 of a public power supply system according to an embodiment of the present invention is explained. FIG. 5 is a configuration diagram of the example 2 of the public power supply system according to the embodiment of the present invention. The example 2 is an example in which in the remote control prevention device 53, in place of the display device 54 configured to display a variable identification marker, an operation button 57 for inputting information to allow supply of a current to the current control unit 14 is provided and at the same time, a gate part 58 is provided in the control unit 21 of the current control unit 14 and the identification marker update unit 55 of the center server 31 is omitted in the example 1 shown in FIG. 1. The same symbol is attached to the same component as that of FIG. 1 and duplicated explanation is omitted.

As shown in FIG. 5, in the remote control prevention device 53, the operation button 57 for permitting supply of a current to the outlet 11 and the DC outlet 12 is provided and the control unit 21 of the current control unit 14 opens the gate part 58 when receiving an operation signal of the operation button 57 and makes valid a current supply command from the center server 31.

Figure 6:
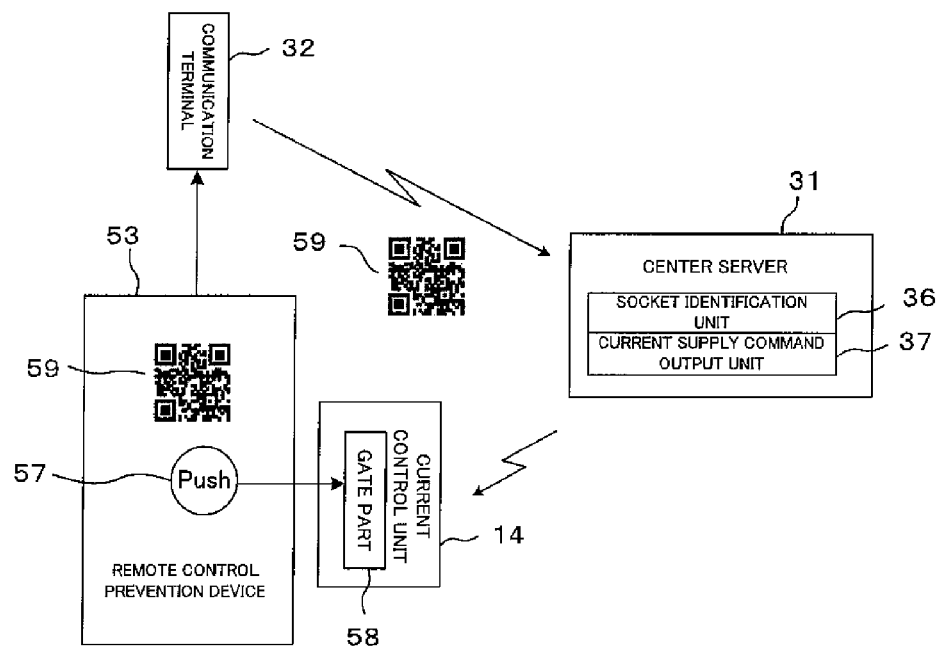
FIG. 6 is an explanatory diagram of the operation to make a request for power supply by a communication terminal in an installation location of an outlet and DC outlet in the example 2 of the public power supply system according to the embodiment of the present invention.

FIG. 6 is an explanatory diagram of the operation to make a request for power supply by the communication terminal 32 in the installation location of the outlet 11 and the DC outlet 12 in the example 2. In the installation location of the outlet 11 and the DC outlet 12, the remote control prevention device 53 is provided near the outlet 11 and the DC outlet 12. In the remote control prevention device 53, a fixed identification marker 59 for identifying the outlet 11 and the DC outlet 12 and the operation button 57 for inputting information to allow supply of a current to the current control unit 14 are provided. FIG. 6 shows a case where the fixed identification marker 59 is a QR code.

When intending to use the outlet 11 and the DC outlet 12 in the installation location, a user reads the fixed identification marker 59 by the communication terminal 32 and transmits it to the center server 31. The center server 31 inputs the fixed identification marker 59 to the outlet identification unit 36. The outlet identification unit 36 identifies the outlet 11 and the DC outlet 12 to which current is to be supplied based on the fixed identification marker 59. Further, the current supply command output unit 37 of the center server 31 checks whether the request for power supply from the communication terminal 32 is made by the user and when this can be confirmed, outputs a current supply command to the current control unit 14 corresponding to the outlet 11 and the DC outlet 12 identified by the outlet identification unit 36.

When receiving the current supply command from the center server 31, the current control unit 14 outputs it to the gate part 58. To the gate part 58 of the current control unit 14, an operation signal from the operation button 57 is also input and when there is an operation signal from the operation button 57, the gate part 58 opens and the current supply command from the center server 31 is made valid. That is, the control unit 21 closes the switches 18a and 18b to supply a current from the distribution line 13 to the outlet 11 and the DC outlet 12.

Figure 7:
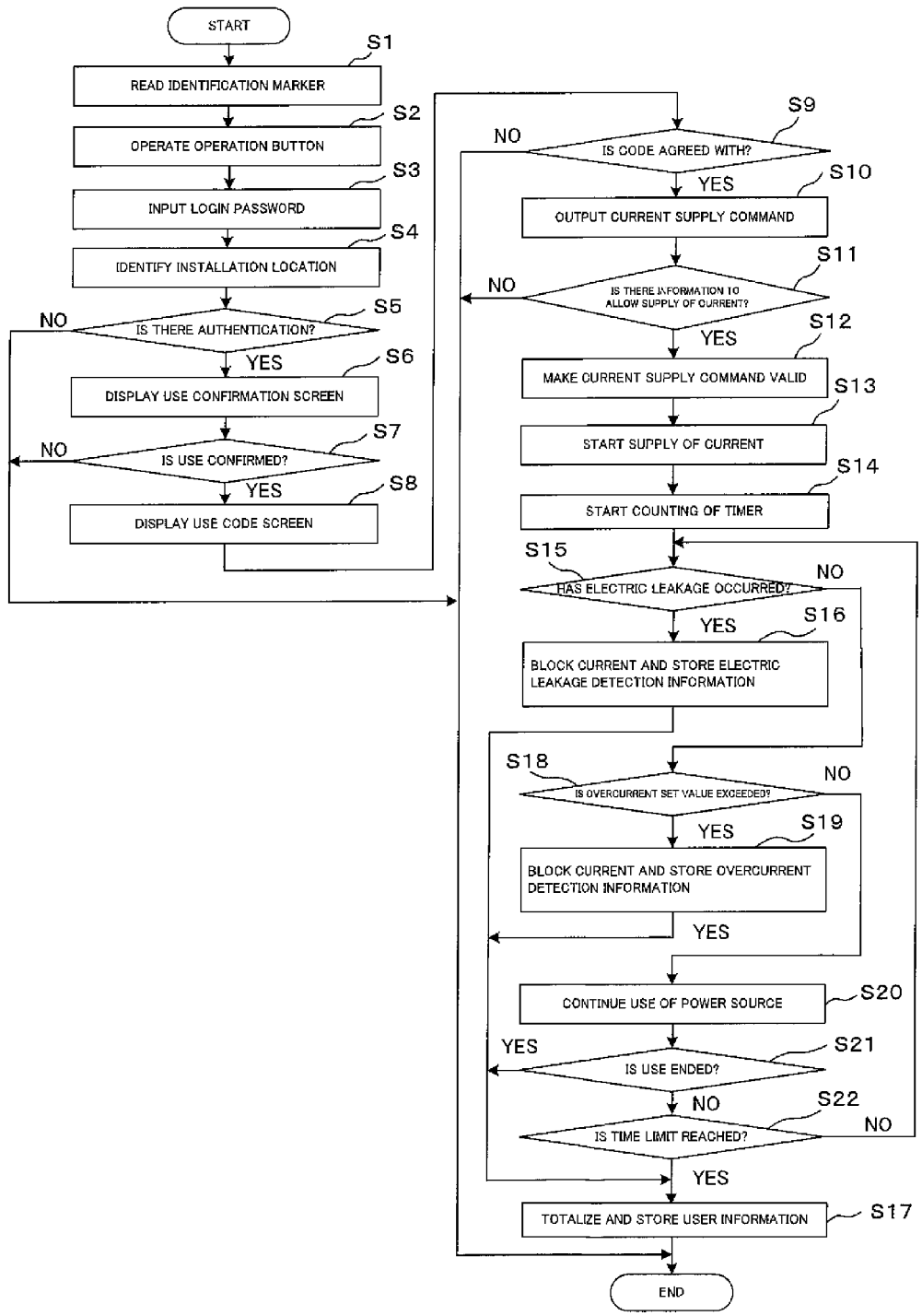
FIG. 7 is a flowchart showing the operation of the example 2 of the public power supply system according to the embodiment of the present invention.

FIG. 7 is a flowchart showing the operation of the example 2 of the public power supply system according to the embodiment of the present invention. First, a user goes to the installation location of the outlet 11 and the DC outlet 12 the user intends to use and reads the fixed identification marker 59 formed in the remote control prevention device 53 in the installation location by the communication terminal 32 (S1). At the same time, the user operates the operation button 57 (S2). This is to input information to allow supply of a current to the current control unit 14.

Next, the user inputs a login password (S3). The center server 31 identifies the installation location of the outlet 11 and the DC outlet 12 to which a current is to be supplied based on the fixed identification marker 59 (S4) and at the same time, checks whether there is authentication based on the login password (S5). When authentication cannot be confirmed, the processing is terminated.

On the other hand, when authentication can be confirmed, the center server 31 displays a use confirmation screen on the communication terminal 32 (S6) and checks whether the user has an intention to use the outlet 11 and the DC outlet 12 (S7). When the user does not confirm the use, the processing is terminated and when the user confirms the use, the center server 31 displays a use code screen on the communication terminal 32 (S8) and checks whether the user agrees with the code (S9). When the user agrees with the code, the center server 31 outputs a current supply command to the current control unit 14 (S10).

The current control unit 14 determines whether there is information to allow supply of a current (S11). This is determined based on whether the operation signal from the operation button 57 of the remote control prevention device 53 is input to the gate part 58 of the current control unit 14. When the operation signal from the operation button 57 of the remote control prevention device 53 is input to the gate part 58, the control unit 21 makes the current supply command valid (S12) and starts to supply a current (S13). The current control unit 14 starts to supply a current and at the same time, activates the timer 26 to start counting of the timer 26 (S14). Due to this, the time of use of the outlet 11 and the DC outlet 12 is measured.

Next, the current control unit 14 determines whether an electric leakage has occurred by the electric leakage detectors 16a and 16b (S15) and when an electric leakage has occurred, the electric leakage detectors 16a and 16b open the switches 18a and 18b to block the current supplied to the outlet 11 and the DC outlet 12 and at the same time, the current control unit 14 stores electric leakage detection information in the electric leakage detection history storage unit 22 (S16) and further, totalizes and stores the user information (the amount of power used, the time of use, the use charge) up to that time (S17) and terminates the processing.

When no electric leakage has occurred, the control unit 21 determines whether the current supplied to the outlet 11 and the DC outlet 12 exceeds the overcurrent set value (S18) and when the overcurrent set value is exceeded, the control unit 21 opens the switches 18a and 18b to block the current supplied to the outlet 11 and the DC outlet 12 and at the same time, stores overcurrent detection information in the overcurrent detection history storage unit 24 (S19) and further, totalizes and stores the user information (the amount of power used, the time of use, the use charge) up to that time (S17) and terminates the processing.

When the overcurrent set value is not exceeded, the use of the power source is continued (S20) and the control unit 21 determines whether the use is ended (S21) and when the use is ended, totalizes and stores the user information (the amount of power used, the time of use, the use charge) up to that time (S17) and terminates the processing. When the use of the outlet 11 and the DC outlet 12 is not ended yet, the control unit 21 determines whether the time of use measured by the timer 26 reaches or exceeds the limit value stored in the use time limit value storage unit 25 (S22) and when the time limit is not reached, the process returns to step S15 and when the time limit is reached, the control unit 21 totalizes and stores the user information (the amount of power used, the time of use, the use charge) up to that time (S17) and terminates the processing. Whether the use is ended is determined based on, for example, whether or not an end command is output from the communication terminal 32 or whether or not the currents Ia and Ib supplied to the outlet 11 and the DC outlet 12 are zero for a period of time equal to or longer than a predetermined period of time.

In the above explanation, the case is explained where in the remote control prevention device 53, the operation button 57 for permitting supply of a current to the outlet 11 and the DC outlet 12 is provided, but, it may also be possible to provide an information input device for inputting specific information to allow supply of a current to the outlet 11 and the DC outlet 12 in place of the operation button 57 and the current control unit 14 may make valid the current supply command from the center server 31 upon receipt of the specific information input from the information input device. The specific information in this case includes information by which a user can be identified, for example, a secret identification number determined in advance, biometric authentication information, etc. When the specific information is a secret identification number determined in advance, the information input device is an input device, such as a ten key, and when the specific information is biometric authentication information (fingerprint, iris, voice print, etc.), the information input device is a device to input the biometric authentication information.

According to the example 2, when a request is made by a user for power supply to the outlet 11 and the DC outlet 12 from the communication terminal 32, the center server 31 outputs a current supply command in advance to the current control unit 14 and the current control unit 14 makes valid the current supply command from the center server 31 when receiving an operation signal of the operation button 57 of the remote control prevention device 53 installed near the outlet 11 and the DC outlet 12 or specific information from the information input device, and therefore, the current supply command is output after the operation in the installation location of the outlet 11 and the DC outlet 12 is performed, without fail, and thus, it is possible to prevent a current from being supplied to the outlet 11 and the DC outlet 12 by remote control apart from the outlet 11 and the DC outlet 12.

Figure 8:
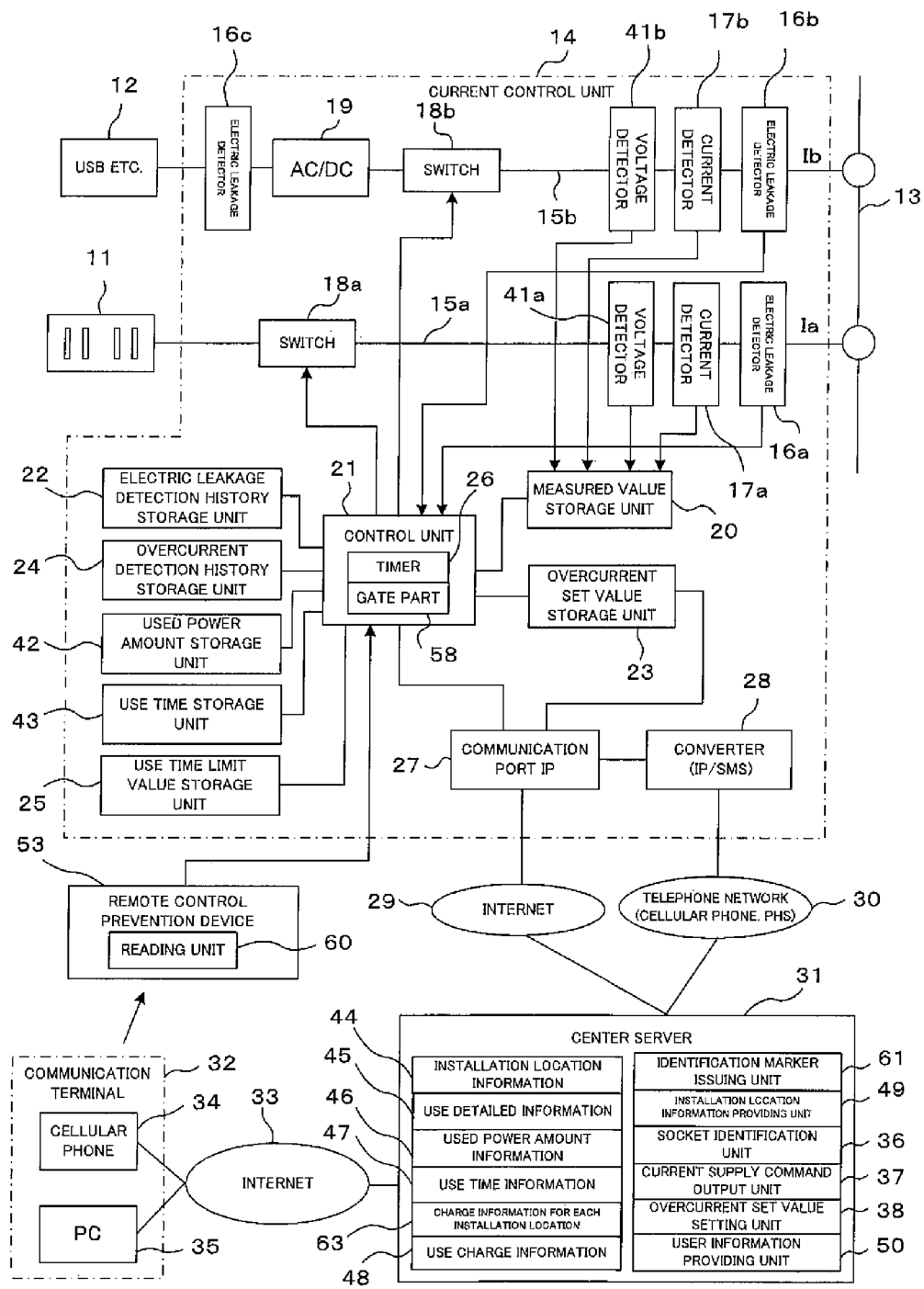
FIG. 8 is a configuration diagram of example 3 of a public power supply system according to an embodiment of the present invention.

Next, example 3 of a public power supply system according to the embodiment of the present invention is explained. FIG. 8 is a configuration diagram of the example 3 of the public power supply system according to the embodiment of the present invention. The example 3 is an example in which in place of the operation button 57 of the remote control prevention device 53, a reading unit 60 for reading a new identification marker, which is information to allow supply of a current, from the communication terminal 32 and inputting it to the current control unit 14 is provided and at the same time, an identification marker issuing unit 61 for issuing a new identification marker to the communication terminal 32 is provided in the center server 31 additionally in the example 2 shown in FIG. 5. The same symbol is attached to the same component as that of FIG. 5 and duplicated explanation is omitted.

As shown in FIG. 8, in the remote control prevention device 53, the reading unit 60 for reading a new identification marker, which is information to allow supply of a current, from the communication terminal 32 is provided. To the communication terminal 32, a new identification marker is transmitted from the identification marker issuing unit 61 of the center server 31 when a request is made to the center server 31 for power supply to the outlet 11 and the DC outlet 12.

The reading unit 60 reads the new identification marker transmitted to the communication terminal 32 from the center server 31 and inputs it to the control unit 21 of the current control unit 14. The control unit 21 of the current control unit 14 has the gate part 58 and opens the gate part 58 when the new identification marker is input and makes valid the current supply command from the center server 31.

Figure 9:
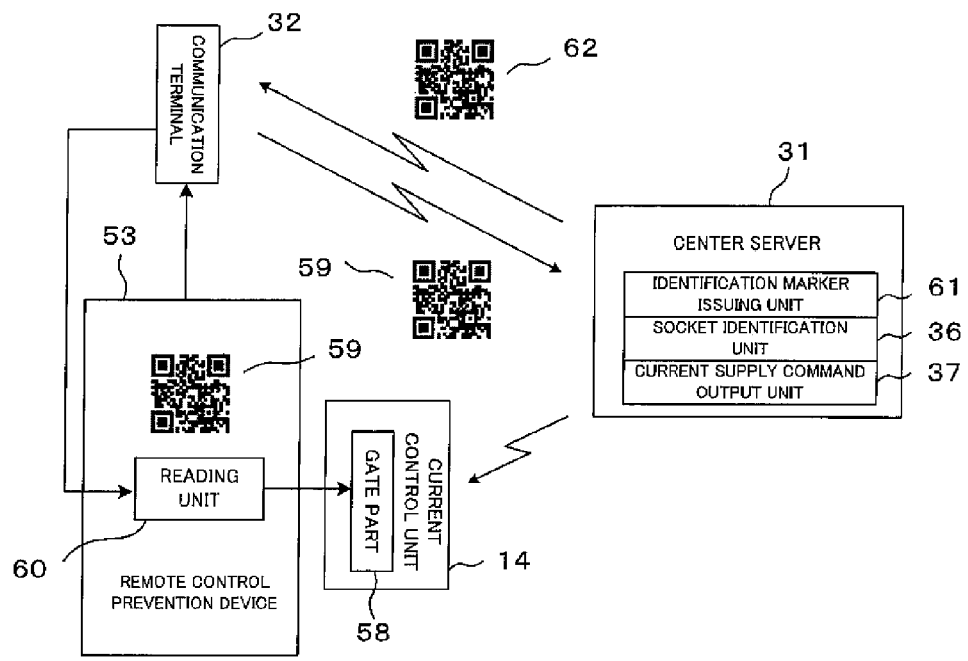
FIG. 9 is an explanatory diagram of the operation to make a request for power supply by a communication terminal in an installation location of an outlet and DC outlet in the example 3 of the public power supply system according to the embodiment of the present invention.

FIG. 9 is an explanatory diagram of the operation to make a request for power supply by the communication terminal 32 in the installation location of the outlet 11 and the DC outlet 12 in the example 3. In the installation location of the outlet 11 and the DC outlet 12, the remote control prevention device 53 is provided near the outlet 11 and the DC outlet 12. In the remote control prevention device 53, the fixed identification marker 59 for identifying the outlet 11 and the DC outlet 12 and the reading unit 60 for reading a new identification marker 62, which is information to allow supply of a current to the current control unit 14, are provided. FIG. 9 shows a case where the fixed identification marker 59 and the new identification marker 62 are QR codes.

When intending to use the outlet 11 and the DC outlet 12 in the installation location, a user reads the fixed identification marker 59 by the communication terminal 32 and transmits it to the center server 31. The center server 31 inputs the fixed identification marker 59 to the outlet identification unit 36 and the identification marker issuing unit 61. The outlet identification unit 36 identifies the outlet 11 and the DC outlet 12 to which current is to be supplied by determining the fixed identification marker 59. The identification marker issuing unit 61 transmits a new identification marker 62 to the communication terminal 32 having transmitted the fixed identification marker 59. Further, the current supply command output unit 37 of the center server 31 checks whether the request for power supply from the communication terminal 32 is made by the user and when this can be confirmed, outputs a current supply command to the current control unit 14 corresponding to the outlet 11 and the DC outlet 12 identified by the outlet identification unit 36.

When receiving the current supply command from the center server 31, the current control unit 14 outputs the command to the control unit 21. To the control unit 21 of the current control unit 14, the new identification marker 62 from the reading unit 60 of the remote control prevention device 53 is also input. That is, the user causes the reading unit 60 to read the new identification marker 62 transmitted from the center server 31 and inputs it to the control unit 21 of the current control unit 14. When the new identification marker 62 from the reading unit 60 of the remote control prevention device 53 is input, the control unit 21 opens the gate part 58 and makes valid the current supply command from the center server 31. That is, the control unit 21 closes the switches 18a and 18b to supply current from the distribution line 13 to the outlet 11 and the DC outlet 12.

Figure 10:
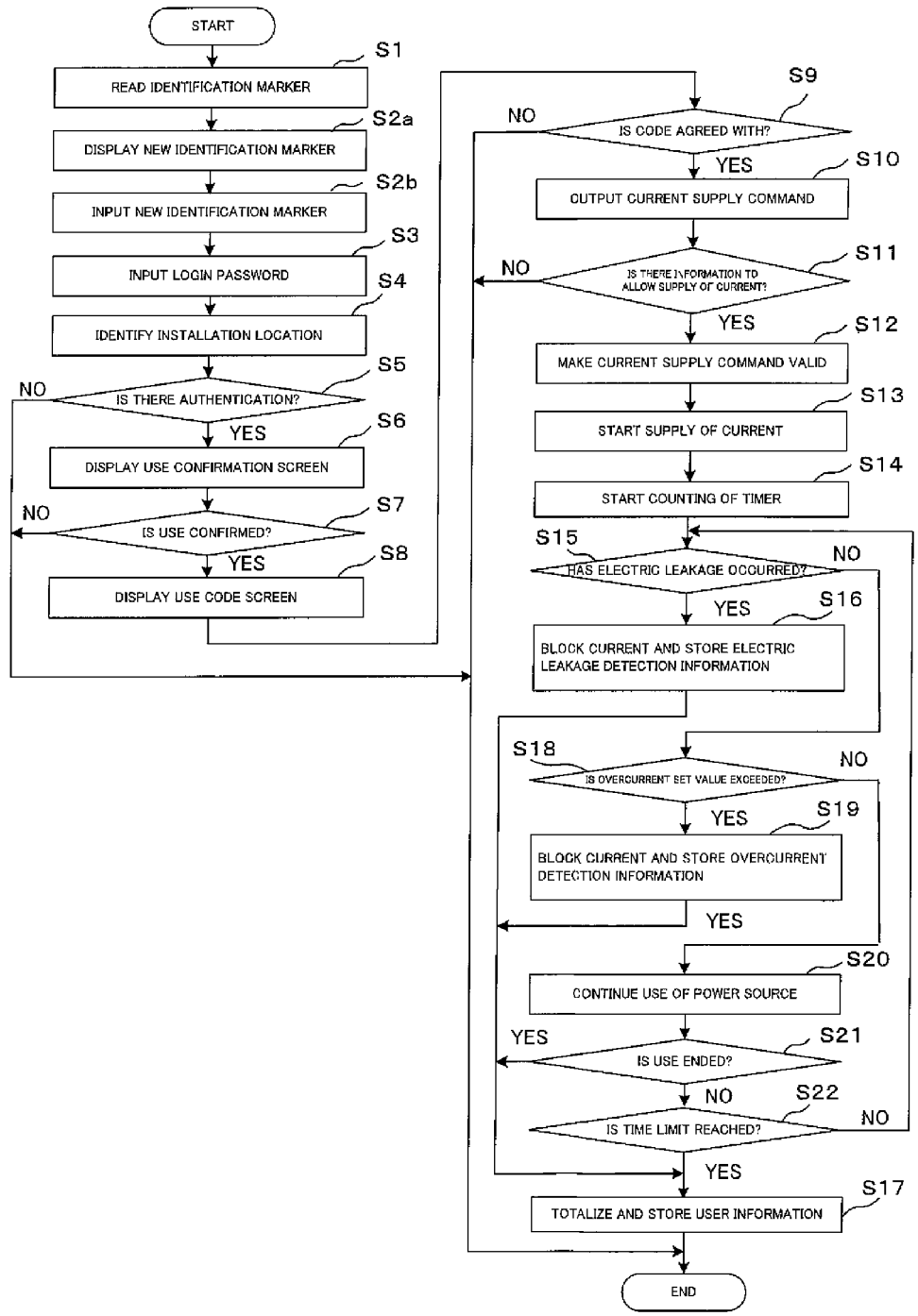
FIG. 10 is a flowchart showing the operation of the example 3 of the public power supply system according to the embodiment of the present invention.

FIG. 10 is a flowchart showing the operation of the example 3 of the public power supply system according to the embodiment of the present invention. The operation is an operation in which in place of step S2 of operating the operation button, step S2a of displaying a new identification marker and step S2b of inputting a new identification marker are provided in the operation of the example 2 shown in FIG. 7.

In FIG. 10, first, a user goes to the installation location of the outlet 11 and the DC outlet 12 the user intends to use and reads the fixed identification marker 59 formed in the remote control prevention device 53 in the installation location by the communication terminal 32 (S1). The fixed identification marker 59 read by the communication terminal 32 is transmitted to the center server 31 and the center server 31, when receiving the fixed identification marker 59, transmits the new identification marker 62 to the communication terminal 32 having transmitted the fixed identification marker 59. Due to this, the center server 31 displays the new identification marker 62 on the communication terminal 32 (S2a). The user causes the reading unit 60 of the remote control prevention device 53 to read the new identification marker 62 received from the center server 31 and inputs the new identification marker 62 to the current control unit 14 (S2b). Due to this, information to allow supply of a current is input to the current control unit 14.

Next, the user inputs a login password (S3) and the center server 31 identifies the installation location of the outlet 11 and the DC outlet 12 to which a current is to be supplied based on the fixed identification marker 59 (S4) and at the same time, checks whether there is authentication based on the login password (S5). When authentication cannot be confirmed, the processing is terminated. On the other hand, when authentication can be confirmed, the center server 31 displays a use confirmation screen on the communication terminal 32 (S6) and checks whether the user has an intention to use the outlet 11 and the DC outlet 12 (S7), and when the user does not confirm the use, the processing is terminated and when the user confirms the use, the center server 31 displays a use code screen on the communication terminal 32 (S8) and checks whether the user agrees with the code (S9). When the user agrees with the code, the center server 31 outputs a current supply command to the current control unit 14 (S10).

Then, the current control unit 14 determines whether there is information to allow supply of a current (S11). This is determined based on whether the new identification marker 62 is input to the current control unit 14 from the reading unit 60 of the remote control prevention device 53. When the new identification marker 62 is input from the reading unit 60 of the remote control prevention device 53, the control unit 21 of the current control unit 14 makes the current supply command valid (S12) and starts to supply a current (S13). The current control unit 14 starts to supply a current and at the same time, activates the timer 26 to start counting of the timer 26 (S14). Due to this, the time of use of the outlet 11 and the DC outlet 12 is measured.

Next, the current control unit 14 determines whether an electric leakage has occurred by the electric leakage detectors 16a and 16b (S15) and when an electric leakage has occurred, the electric leakage detectors 16a and 16b open the switches 18a and 18b to block the current supplied to the outlet 11 and the DC outlet 12 and at the same time, the current control unit 14 stores electric leakage detection information in the electric leakage detection history storage unit 22 (S16) and further, totalizes and stores the user information (the amount of power used, the time of use, the use charge) up to that time (S17) and terminates the processing.

When no electric leakage has occurred, the control unit 21 determines whether the current supplied to the outlet 11 and the DC outlet 12 exceeds the overcurrent set value (S18) and when the overcurrent set value is exceeded, the control unit 21 opens the switches 18a and 18b to block the current supplied to the outlet 11 and the DC outlet 12 and at the same time, stores overcurrent detection information in the overcurrent detection history storage unit 24 (S19) and further, totalizes and stores the user information (the amount of power used, the time of user, the use charge) up to that time (S17) and terminates the processing.

When the overcurrent set value is not exceeded, the use of the power source is continued (S20) and the control unit 21 determines whether the use is ended (S21) and when the use is ended, totalizes and stores the user information (the amount of power used, the time of use, the use charge) up to that time (S17) and terminates the processing. When the use of the outlet 11 and the DC outlet 12 is not ended yet, the control unit 21 determines whether the time of use measured by the timer 26 reaches or exceeds the limit value stored in the use time limit value storage unit 25 (S22) and when the time limit is not reached, the process returns to step S15 and when the time limit is reached, the control unit 21 totalizes and stores the user information (the amount of power used, the time of use, the use charge) up to that time (S17) and terminates the processing. Whether the use is ended is determined based on whether or not an end command is output from the communication terminal 32 or whether or not the currents Ia and Ib supplied to the outlet 11 and the DC outlet 12 are zero for a period of time equal to or longer than a predetermined period of time. In the case of the example 3 also, it is possible to obtain the same effect as that in the case of the example 2.

Figure 11:
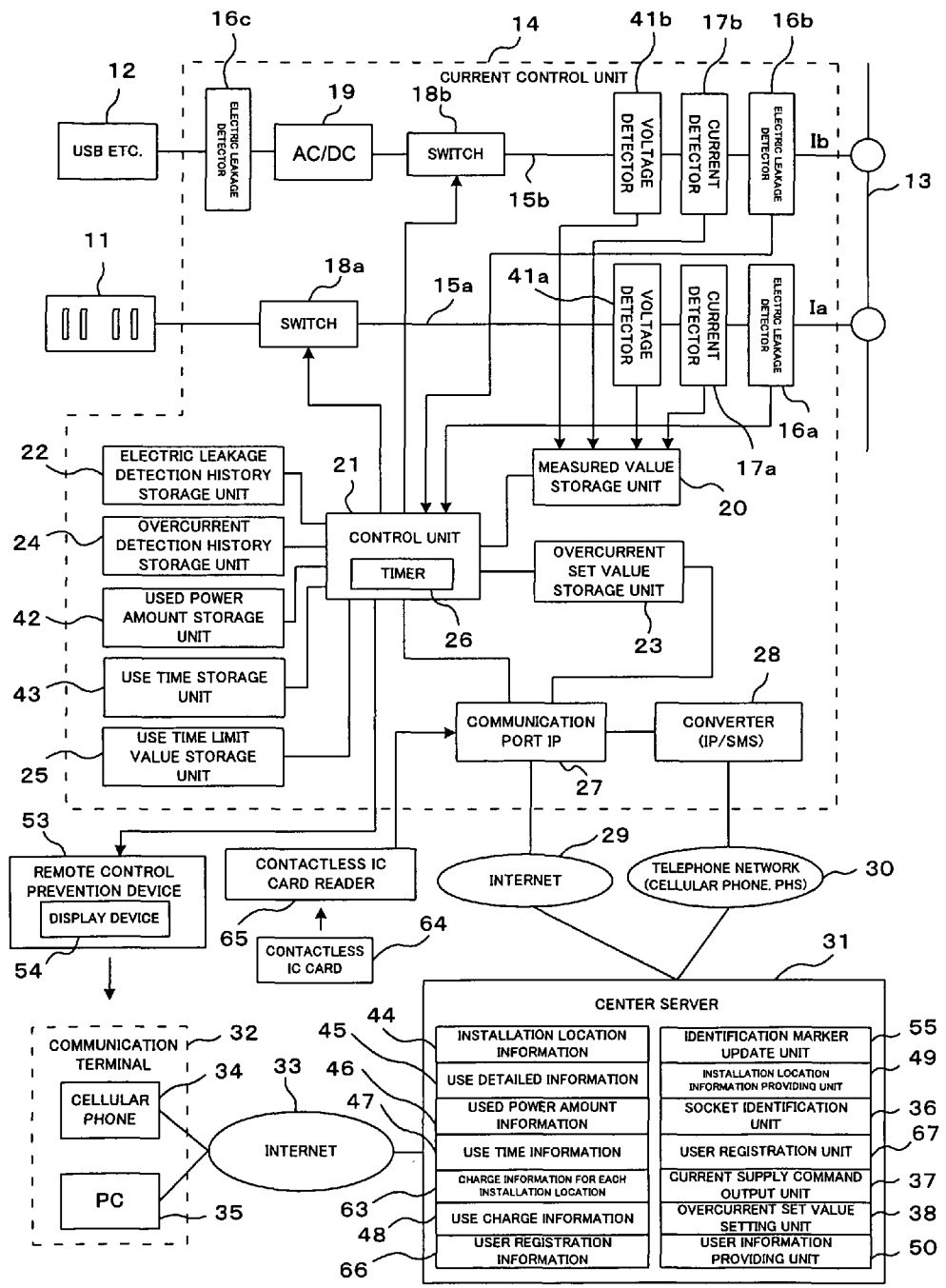
FIG. 11 is a configuration diagram of example 4 of a public power supply system according to an embodiment of the present invention.

Next, example 4 of a public power supply system according to an embodiment of the present invention is explained. FIG. 11 is a configuration diagram of the example 4 of the public power supply system according to the embodiment of the present invention. The example 4 is an example in which a user specifying information reader configured to read user specifying information for specifying a user is provided near the outlet 11 and when the user specifying information reader reads user specifying information, the center server inputs the user specifying information from the current control unit and outputs a current supply command to the current control unit 14 when the user specifying information is user-registered in the example 1 shown in FIG. 1.

FIG. 11 shows a case where as a user specifying information reader, a contactless IC card reader 65 configured to read the contents of a contactless IC card 64 is provided near the outlet 11. The contactless IC card reader 65 is connected to the communication port 27 of the current control unit 14 and the center server 31 stores the ID of the user-registered contactless IC card 64 in a storage device as user registration information 66.

In the user registration information 43, a user who has agreed with the use code of the outlet 11 is registered. Consequently, for a user who intends to agree with the use code of the outlet 11 from now, the center server 31 also has a user registration unit 67 for creating the user registration information 66 when a user performs user registration. The same symbol is attached to the same element as that of FIG. 1 and duplicated explanation is omitted.

As shown in FIG. 11, the contactless IC card reader 65 is connected to the current control unit 14 and installed near the outlet 11 and the DC outlet 12. The contactless IC card reader 65 reads the contents of the contactless IC card 64 when the contactless IC card 64 carried by the user is held up and outputs the contents to the communication port 27 of the current control unit 14.

The contactless IC card 64 is an IC card incorporated in "OSAIFU KEITAI" (registered trademark), which is a cellular phone, Felice card, etc., having information for identifying a user.

When inputting the contents of the contactless IC card 64 read by the contactless IC card reader 65, the communication port 27 of the current control unit 14 transmits the contents of the contactless IC card to the center server 31 via the Internet 29. The outlet identification unit 36 of the center server 31 identifies the communication port 27 from which the contents of the contactless IC card 64 are transmitted and identifies the contactless IC card reader 65. Then, the current supply command output unit 37 of the center server 31 determines whether or not the input ID of the contactless IC card is registered in the user registration information 66 and outputs a current supply command to the current control unit 14 via the Internet 29 or the telephone network 30 when the ID of the contactless IC card 64 is registered in the user registration information 66. Due to this, the control unit 21 of the current control unit 14 controls supply of a current to the outlet 11 and the DC outlet 12 based on the current supply command.

Figure 12:
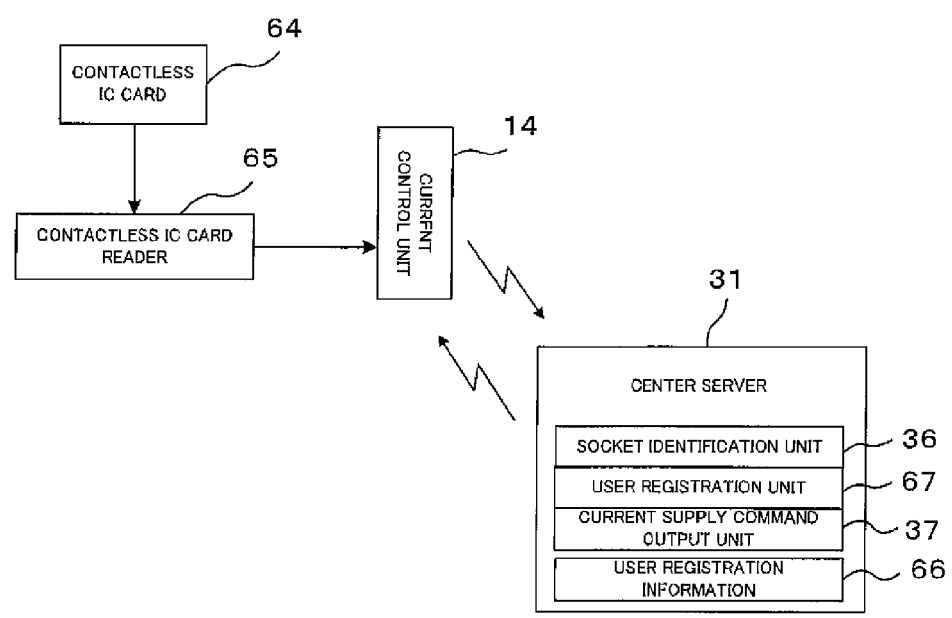
FIG. 12 is an explanatory diagram of the operation to make a request for power supply by a contactless IC card in an installation location of an outlet and DC outlet in the example 4 of the public power supply system according to the embodiment of the present invention.

FIG. 12 is an explanatory diagram of the operation to make a request for power supply by the contactless IC card 64 in the installation location of the outlet 11 and the DC outlet 12. In the installation location of the outlet 11 and the DC outlet 12, the contactless IC card reader 65 is provided near the outlet 11 and the DC outlet 12.

When intending to use the outlet 11 and the DC outlet 12 in the installation location, a user holds up the contactless IC card 64 over the contactless IC card reader 65. The contactless IC card reader 65 reads the contents of the contactless IC card 64 held up by the user and outputs the contents to the communication port 27 of the current control unit 14. The communication port 27 of the current control unit 14 transmits the input contents of the contactless IC card 64 to the center server 31 via the Internet 29. The outlet identification unit 36 of the center server 31 identifies the contactless IC card reader 65 by identifying the communication port 27 from which the contents of the contactless IC card 64 are transmitted and the current supply command output unit 37 of the center server 31 determines whether or not the input ID of the contactless IC card 64 is registered in the user registration information 66 and when registered in the user registration information 66, outputs the current supply command to the current control unit 14 via the Internet 29 or the telephone network 30.

Figure 13:
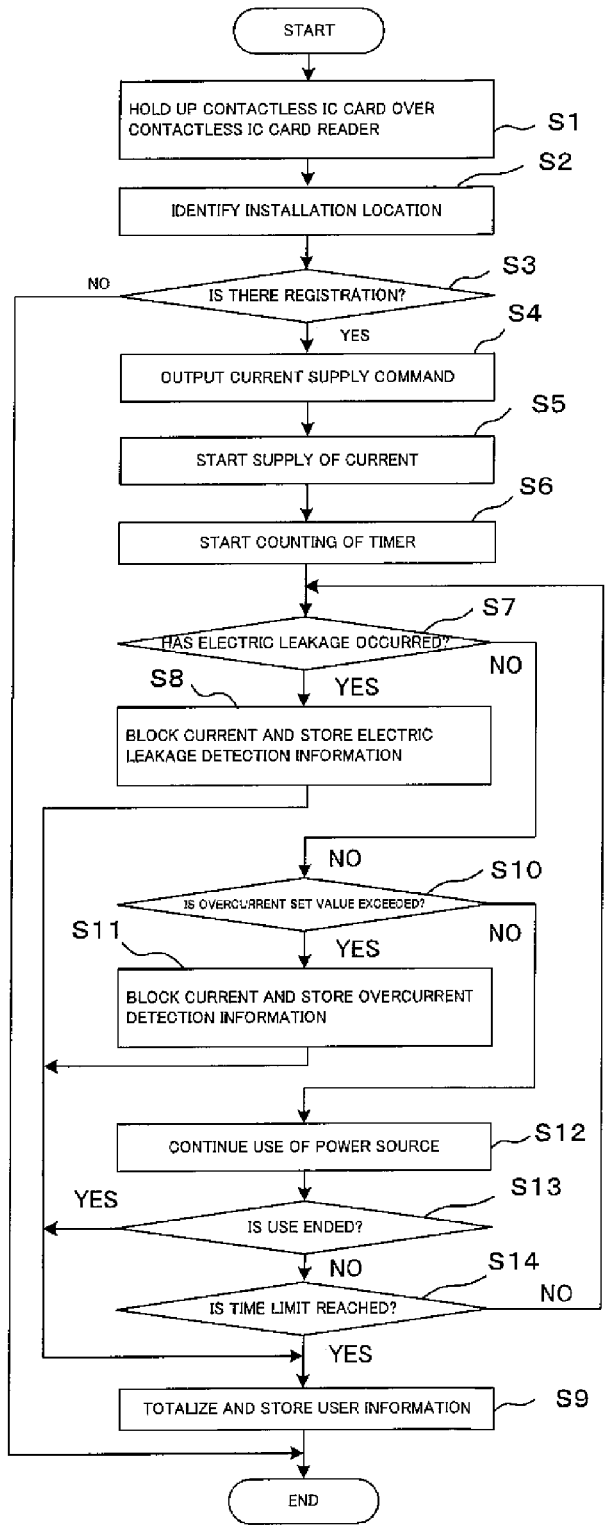
FIG. 13 is a flowchart showing the operation of the example 4 of the public power supply system according to the embodiment of the present invention.

FIG. 13 is a flowchart showing the operation of the example 4 of the public power supply system according to the embodiment of the present invention. First, a user goes to the installation location of the outlet 11 and the DC outlet 12 the user intends to use and holds up the contactless IC card 64 over the contactless IC card reader 65 in the installation location (S1). The outlet identification unit 36 of the center server 31 identifies the installation location of the outlet 11 and the DC outlet 12 to which a current is to be supplied by identifying the contactless IC card reader 65 having read the contents of the contactless IC card (S2).

The current supply command output unit 37 of the center server 31 determines whether or not the ID of the contactless IC card 64 read by the contactless IC card reader 65 is registered in the user registration information 66 (S3) and when not registered in the user registration information 66, the processing is terminated.

Note that the user registration unit 67 may prompt a user to perform user registration when the ID of the contactless IC card 64 read by the contactless IC card reader 65 is not registered in the user registration information 66. For example, by displaying a registration screen of the user registration information 66 on the display unit of the contactless IC card reader 65, a user is prompted to perform user registration.

On the other hand, when user-registered by the determination of step S3, the current supply command output unit 37 of the center server 31 outputs a current supply command to the current control unit 14 (S4). This is because the user who is user-registered is a user who has already agreed with the use code of the outlet 11. The current control unit 14 starts to supply a current upon receipt of the current supply command (S5) and at the same time, activates the timer 26 to start counting of the timer 26 (S6). Due to this, the time of use of the outlet 11 and the DC outlet 12 is measured.

The current control unit 14 determines whether an electric leakage has occurred by the electric leakage detectors 16a and 16b (S7) and when an electric leakage has occurred, the electric leakage detectors 16a and 16b open the switches 18a and 18b to block the current supplied to the outlet 11 and the DC outlet 12 and at the same time, the current control unit 14 stores electric leakage detection information in the electric leakage detection history storage unit 22 (S8) and further, totalizes and stores the user information (the amount of power used, the time of use, the use charge) up to that time (S9) and terminates the processing. When no electric leakage has occurred, the control unit 21 determines whether the current supplied to the outlet 11 and the DC outlet 12 exceeds the overcurrent set value (S10) and when the overcurrent set value is exceeded, the control unit 21 opens the switches 18a and 18b to block the current supplied to the outlet 11 and the DC outlet 12 and at the same time, stores overcurrent detection information in the overcurrent detection history storage unit 24 (S11) and further, totalizes and stores the user information (the amount of power used, the time of use, the use charge) up to that time (S9) and terminates the processing. When the overcurrent set value is not exceeded, the use of the power source is continued (S12).

Then, the control unit 21 determines whether the use is ended (S13) and when the use is ended, terminates the processing. When the use of the outlet 11 and the DC outlet 12 is not ended yet, the control unit 21 determines whether the time of use measured by the timer 26 reaches or exceeds the limit value stored in the use time limit value storage unit 25 (S14) and when the time limit is not reached, the process returns to step S7 and when the time limit is reached, the control unit 21 terminates the processing. Whether the use is ended is determined based on, for example, whether or not an end command is output by holding up again the contactless IC card 64 over the contactless IC card reader 65, or whether or not the currents Ia and Ib supplied to the outlet 11 and the DC outlet 12 are zero for a period of time equal to or longer than a predetermined period of time.

According to the example 4 of the embodiment of the present invention, a user may use power in a public location not in a customer site, also by the contactless IC card besides the communication terminal. In this case, a user who is user-registered is a user who has already agreed with the use code of the outlet 11, and therefore, the processing to confirm agreement with the use code is no longer necessary.

Figure 14:
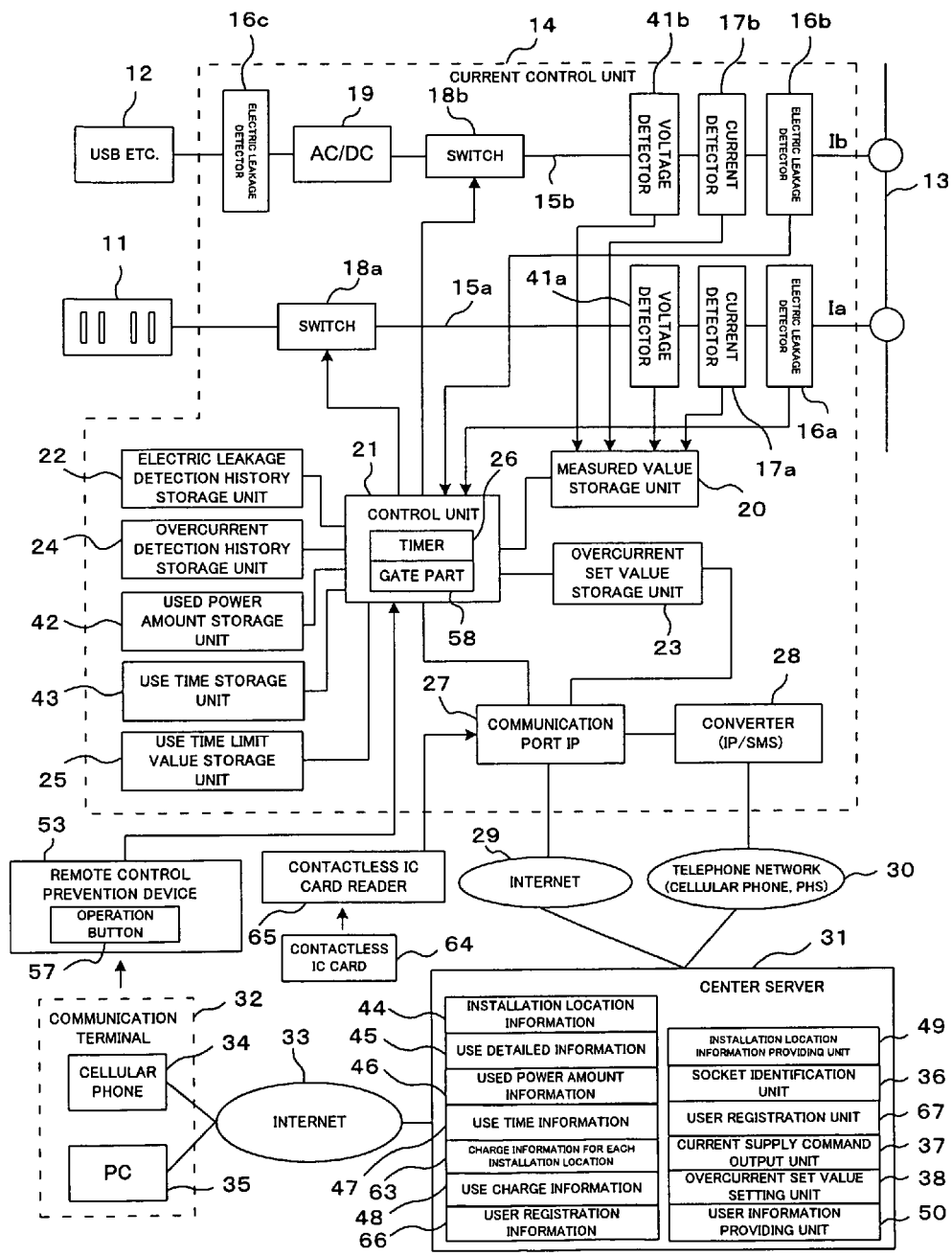
FIG. 14 is a configuration diagram of another example of the example 4 of the public power supply system according to the embodiment of the present invention.
Figure 15:
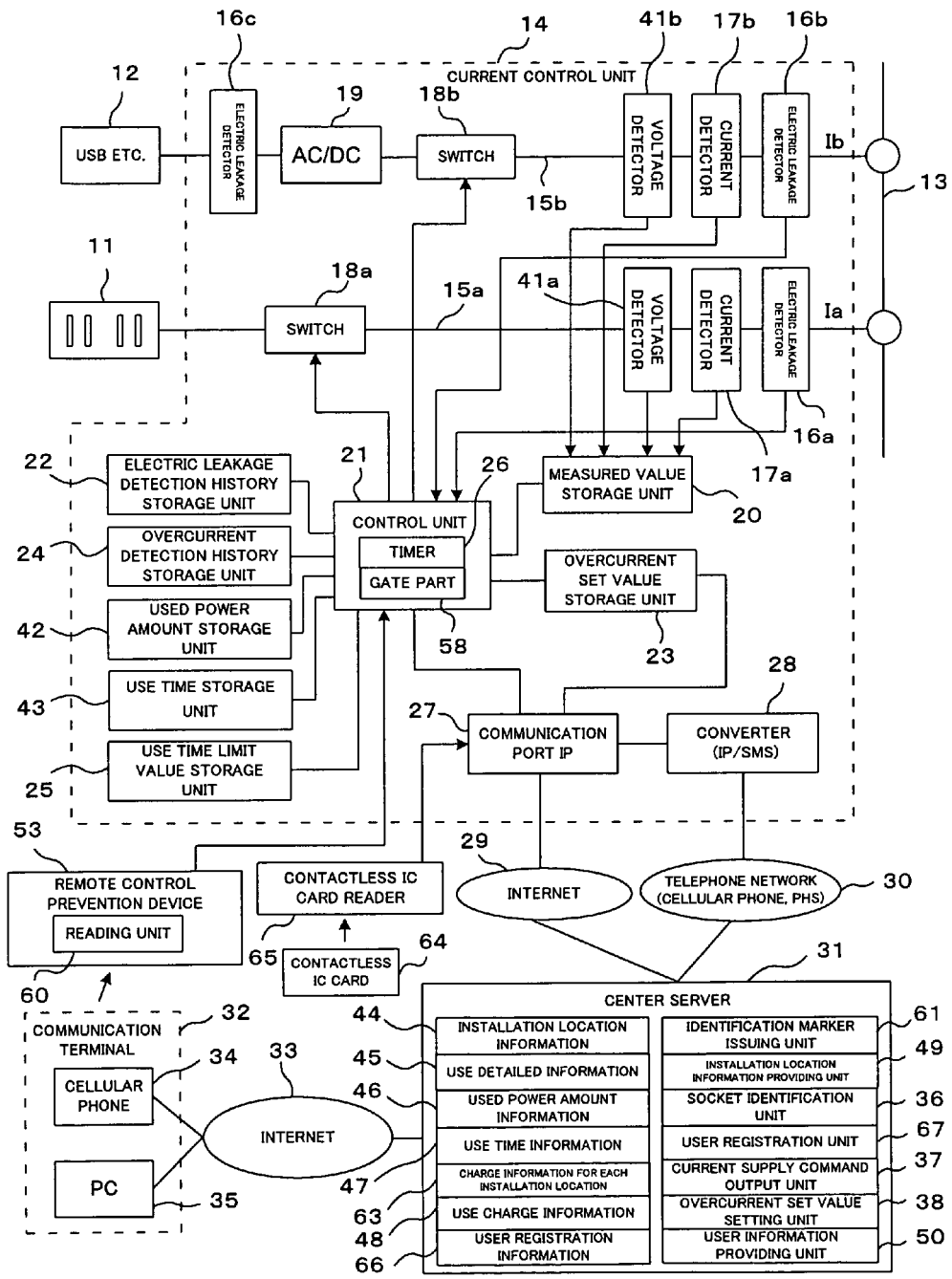
FIG. 15 is a configuration diagram of still another example of the example 4 of the public power supply system according to the embodiment of the present invention.

In the above explanation, different from the example 1 shown in FIG. 1, near the outlet 11, as the user specifying information reader, the contactless IC card reader 65 configured to read the contents of the contactless IC card 64 is provided near the outlet 11, but, as shown in FIG. 14, different from the example 2 shown in FIG. 5, it may also be possible to provide the contactless IC card reader 65 configured to read the contents of the contactless IC card 64 near the outlet 11 as the user specifying information reader. Further, as shown in FIG. 15, different from the example 3 shown in FIG. 8, it is also possible to provide the contactless IC card reader 65 configured to read the contents of the contactless IC card 64 near the outlet 11 as the user specifying information reader.

Further, in the above explanation, a case is shown, where as the user specifying information reader, the contactless IC card reader 65 configured to read the contents of the contactless IC card 64 is provided, but, this is not limited, and it is also possible to use a user specifying information reader configured to read user specifying information, such as the fingerprint, iris, voice print, bone structure of the face, and vein of a user.

REFERENCE SIGNS LIST 11 outlet
12 DC outlet
13 distribution line
14 current control unit
15 electric wire
16 electric leakage detector
17 current detector
18 switch
19 AC/DC converter
20 measured value storage unit
21 control unit
22 electric leakage detection history storage unit
23 overcurrent set value storage unit
24 overcurrent detection history storage unit
25 use time limit value storage unit
26 timer
27 communication port
28 protocol converter
29 Internet
30 telephone network
31 center server
32 communication terminal
33 Internet
34 cellular phone
35 personal computer
36 outlet identification unit
37 current supply command output unit
38 overcurrent set value setting unit
39 identification marker display unit
40 identification marker
41 voltage detector
42 used power amount storage unit
43 use time storage unit
44 installation location information
45 use detailed information
46 used power amount information
47 use time information
48 use charge information
49 installation location information providing unit
50 user information providing unit
51 identification marker display unit
52 identification marker
53 remote control prevention device
54 display device
55 identification marker update unit
56 variable identification marker
57 operation button
58 gate part
59 fixed identification marker
60 reading unit
61 identification marker issuing unit
62 new identification marker
63 charge information for each installation location
64 contactless IC card
65 contactless IC card reader
66 user registration information
67 user registration unit

The invention claimed is:

1. A public power supply system comprising:
an outlet installed in advance in a predetermined public location and supplied with power from a distribution line;
a current control unit connected between the outlet and the distribution line and configured to control whether or not to allow supply of a current to be supplied to the outlet;
a communication terminal requesting the outlet to supply power;
a remote control prevention device installed at the outlet and configured to generate information to allow supply of a current to the outlet by an actual operation of a user; and
a center server connected with the communication terminal via the Internet and connected with the current control unit via a communication network, and configured to determine whether or not information to allow supply of a current has been received from the remote control prevention device when there is a request by a user to supply power to the outlet from the communication terminal and to output a current supply command to the current control unit when the information to allow supply of a current has been received, wherein
the remote control prevention device includes a display device configured to display a variable identification marker for identifying the outlet, which is changed each time the outlet is used, and
the center server determines that information to allow supply of a current is received when an actual operation to cause the communication terminal to read the variable identification marker displayed on the display device is performed by a user and the variable identification marker is transmitted to the center server and the variable identification marker is received from the communication terminal.

2. The public power supply system according to claim 1, wherein
a user specifying information reader configured to read user specifying information for specifying a user is provided to the current control unit at the outlet, and
the center server outputs a current supply command to the current control unit when the user specifying information read by the user specifying information reader is user-registered.

3. The public power supply system according to claim 2, wherein
the user specifying information is user identifying information stored in a contactless IC card and the user specifying information reader is a contactless IC card reader.

4. The public power supply system according to claim 1, wherein
the center server transmits information of the outlet installation location to the communication terminal when there is a request by the user to search for the outlet installation location from the communication terminal.

5. The public power supply system according to claim 1, wherein
the center server totalizes the time of use of the outlet, the amount of power used, and the use charge for each of the users.

6. The public power supply system according to claim 1, wherein
the current control unit blocks a current from the distribution line when detecting an electric leakage in a lower system of the distribution line.

7. The public power supply system according to claim 1, wherein
the current control unit blocks a current from the distribution line when a supply current to the outlet exceeds an overcurrent set value determined in advance.

8. The public power supply system according to claim 1, wherein
the current control unit has a use time limit value storage unit configured to set a limit value of the time of use of the outlet and a timer configured to turn off current supplied to the outlet when the time of use of the outlet reaches the limit value set in the use time limit value storage unit, and
the center server outputs a count start command of the timer as well as a current supply command of the outlet.

9. The public power supply system according to claim 1, wherein
the center server has a use time limit value storage unit configured to set a limit value of the time of use of the outlet and a timer configured to turn off current supplied to the outlet when the time of use of the outlet reaches the limit value set in the use time limit value storage unit and outputs a count start command of the timer as well as a current supply command of the outlet.

10. The public power supply system according to claim 1, wherein
the current control unit supplies an AC current supplied from the distribution line to the outlet and at the same time, converts the AC current into a DC current and supplies the converted DC current to a DC outlet.

11. The public power supply system according to claim 1, wherein
a communication network connecting the current control unit and the center server is the Internet or a communication network using a protocol other than the Internet protocol.

* * * * *